United States Patent [19]
Murata

[11] Patent Number: 5,694,609
[45] Date of Patent: Dec. 2, 1997

[54] DOCUMENT PROCESSING APPARATUS FOR PROCESSING A STRUCTURED DOCUMENT USING EMBEDDING NODES AND MOLD NODES

[75] Inventor: Makoto Murata, Kanagawa, Japan

[73] Assignee: Fuji Xerox Co., Ltd., Tokyo, Japan

[21] Appl. No.: 297,742

[22] Filed: Aug. 30, 1994

[30] Foreign Application Priority Data

Aug. 31, 1993 [JP] Japan .................. P.HEI.5-240400

[51] Int. Cl.[6] .................................................. G06F 17/22
[52] U.S. Cl. .................................................. 395/774
[58] Field of Search ............... 364/419.08–419.1; 395/145–148, 759–761, 766, 774, 784, 785, 792

[56] References Cited

U.S. PATENT DOCUMENTS

| | | | |
|---|---|---|---|
| 5,077,760 | 12/1991 | Lepage | 358/409 X |
| 5,182,709 | 1/1993 | Makus | 395/759 |
| 5,355,492 | 10/1994 | Frankel et al. | 395/707 |
| 5,379,373 | 1/1995 | Hayashi et al. | 395/774 |
| 5,381,523 | 1/1995 | Hayashi | 395/774 |
| 5,434,962 | 7/1995 | Kyojima et al. | 395/774 |
| 5,438,512 | 8/1995 | Mantha et al. | 364/774 X |
| 5,459,827 | 10/1995 | Allouche et al. | 395/774 |
| 5,475,805 | 12/1995 | Murata | 395/774 |
| 5,499,329 | 3/1996 | Motoyama et al. | 395/774 |
| 5,499,331 | 3/1996 | Hayashi et al. | 395/774 |

OTHER PUBLICATIONS

Lubich, A Proposed Extension of the ODA Document Model for the Processing of Multimedia Documents, Communications Software 1991 Conference, Mar. 1991, pp. 59–72.

"Element Structure", ISO 8879, pp. 302–303.

"5.4 Explicitness of Link Process Design", The SGML Handbook, pp.176–177.

"Introduction to Generalized Markup", The SGML Handbook, pp.5–108.

"Information processing—Text and office systems—Office Document Architecture (ODA) and interchange format", ISO 8613-1, pp.ii–iv, 1–37 (1989).

*Primary Examiner*—Anton W. Fetting
*Attorney, Agent, or Firm*—Finnegan, Henderson, Farabow, Garrett & Dunner, L.L.P.

[57] ABSTRACT

A document retaining section retains a structured document in which a logical structure and a layout structure are correlated with each other by using embedding nodes each being inserted between a unit logical node and a logical node immediately above the unit logical node and representing a corresponding relationship between the unit logical node and a unit layout node, and mold nodes provided in place of respective unit layout nodes. A document processing section is capable of processing a partial logical structure of the document retained by the document retaining section together with a partial layout structure corresponding to the partial logical structure.

4 Claims, 34 Drawing Sheets

FIG. 17

```
< log_root >
< sec >
< header >
< sec_num > 1 < \ sec_num >
< header_text > DOCUMENT ARCHITECTURE <\ header_text >
< \ header >
< para > The document editor .... < \ para >
< para > The structured document .... < \ para >
< \ sec >
< sec >
< header >
< sec_num > 2 < \ sec_num >
< header_text > DOCUMENT FILE FORMAT < \ header_text >
< \ header >
< para > Recentrly--- < \ para >
< \ sec >
< \ log_root >
```

*FIG. 18*

```
< lay_root >
< page >
< body_frame >
< left_col >
< header_frame >
< block >
< line > 1 < \ line >
< \ block >
< block >
< line > DOCUMENT < \ line >
< line > ARCHITECTURE < \ line >
< \ block >
< \ header_frame >
< block >
< line > The document editor .... < \ line >
< line > ...... < \ line >
< \ block >
< \ left_col >
< right_col >
<block >
< line > ...... < \ line >
< line > ...... < \ line >
< \ block >
< block >
< line > The structured document ...... < \ line >
< line > ...... < \ line >
< \ block >
< \ right_col >
< \ body_frame >
< \ page >
```

```
< page >
< body_frame >
< left_col >
< header_frame >
< block >
< line > 2 < \ line >
< \ block >
< block >
< line > DOCUMENT FILE < \ line >
< line > FORMAT < \ line >
< \ block >
< \ header_frame >
< block >
< line > Recently .... < \ line >
< line > ...... < \ line >
< \ block >
< \ left_col >
< right_col >
< \ right_col >
< \ body_frame >
< \ page >
< \ lay_root >
```

FIG. 19

< log_root, id = "3" >
< sec, id = "30" >
< header, id = "300" >
< sec_num, id = "3000" >
< header_text, id = "3001" >
< para, id = "301" >
< para, id = "302" >
< sec, id = "31" >
< header, id = "310" >
< sec_num, id = "3100" >
< header_text, id = "3101" >
< para, id = "311" >

FIG. 20

< lay_root, id = "2" >
< page, id = "20" >
< body_frame, id "200" >
< left_col, id = "2000" >
< header_frame, id = "20000" >
< block, id = "200000" >
< line, id = "2000000" >
< block, id = "200001" >
< line, id = "2000010" >
< line, id = "2000011" >
< block, id = "20001" >
< line, id = "200010" >
< line, id = "200011" >
< right_col, id = "2001" >
< block, id = "20010" >
< line, id = "200100" >
< line, id = "200101" >
< block, id = "20011" >
< line, id = "200110" >
< line, id = "200111" >

< page, id = "21" >
< body_frame, id "210" >
< left_col, id = "2100" >
< header_frame, id = "21000" >
< block, id = "210000" >
< line, id = "2100000" >
< block, id = "210001" >
< line, id = "2100010" >
< line, id = "2100011" >
< block, id = "21001" >
< line, id = "210010" >
< line, id = "210111" >
< right_col, id = "2101" >

FIG. 21

```
< log_id = "30000", lay_id = "20000000" > 1
< log_id = "30010", lay_id = "20000100" > DOCUMENT
< log_id = "30011", lay_id = "20000110" > ARCHITECTURE
< log_id = "3010", lay_id = "2000100" > The document editor ····
< log_id = "3011", lay_id = "2000110" > ······
< log_id = "3012", lay_id = "2001000" > ······
< log_id = "3013", lay_id = "2001010" > ······
< log_id = "3020", lay_id = "2001100" > The structured document ····
< log_id = "3021", lay_id = "2001110" > ······
< log_id = "31000", lay_id = "21000000" > 2
< log_id = "31010", lay_id = "21000100" > DOCUMENT FILE
< log_id = "31011", lay_id = "21000110" > FORMAT
< log_id = "3110", lay_id = "2100100" > Recently ····
< log_id = "3111", lay_id = "2100110" > ······
```

FIG. 22

```
< (log) log_root >
< (lay) lay_root >
< (lay) page >
< (lay) body_frame >
< (lay) left_col >
< (log) sec >
< (log) header > < (lay) header_frame >
< (log) sec_num > < (lay) block >
< (lay) line > 1 < (lay) \ line >
< (lay) \ block > < (log) \ sec_num >
< (log) header_text > < (lay) block >
< (lay) line > DOCUMENT < (lay) \ line >
< (lay) line > ARCHITECTURE < (lay) \ line >
< (lay) \ block > < (log) \ header_text >
< (lay) \ header_frame > < (log) \ header >
< (log) para > < (lay) block >
< (lay) line > The document editor ······ < (lay) \ line >
< (lay) line > ······ < (lay) \ line >
< (lay) \ block >
< (lay) \ left_col >
< (lay) right_col >
< (lay) block >
< (lay) line > ······ < (lay) \ line >
< (lay) line > ······ < (lay) \ line >
< (lay) \ block > < (log) \ para >
< (log) para > < (lay) block >
< (lay) line > The structured document ······ < (lay) \ line >
< (lay) line > ······ < (lay) \ line >
< (lay) \ block > < (log) \ para >
< (log) \ sec >
< (lay) \ right_col >
< (lay) \ body_frame >
< (lay) \ page >
```

FIG. 23

< (lay) page >
< (lay) body_frame >
< (lay) left_col >
< (log) sec >
< (log) header > < (lay) header_frame >
< (log) sec_num > < (lay) block >
< (lay) line > 2 < (lay) \ line >
< (lay) \ block > < (log) \ sec_num >
< (log) header_text > < (lay) block >
< (lay) line > DOCUMENT FILE < (lay) \ line >
< (lay) line > FORMAT < (lay) \ line >
< (lay) \ block > < (log) \ header_text >
< (lay) \ header_frame > < (log) \ header >
< (log) para > < (lay) block >
< (lay) line > Recently ⋯⋯ < (lay) \ line >
< (lay) line > ⋯⋯ < (lay) \ line >
< (lay) \ block > < (log) \ para >
< (log) \ sec >
< (lay) \ left_col >
< (lay) right_col >
< (lay) \ right_col >
< (lay) \ body_frame >
< (lay) \ page >
< (lay) \ lay_root >
< (lay) \ log_root >

FIG. 25

< embedding > < (log) log_root > < ( lay) lay_root >
< (lay) page > < (lay) body_frame > < (lay) left_col >
< (log) sec >
[ Embedding description for the first section header node ] < mold >
[ Embedding description for the first paragraph node ] < mold >
< (lay) \ left_col > < (lay) right_col >
< mold >
[ Embedding description for the second paragraph node ] < mold >
< (lay) \ right_col > < (lay) \ body_frame > < (lay) \ page >
< (lay) page > < (lay) body_frame > < (lay) left_col >
< (log) \ sec > < (log) sec >
[ Embedding description for the second section header node ] < mold >
[ Embedding description for the second paragraph node ] < mold >
< (lay) \ left_col > < (lay) right_col > < (lay) \ right_col >
< (lay) \ body_frame > < (lay) \ page > < (lay) \ lay_root >
< (log) \ sec > < (log) \ log_root >
< \ embedding >

FIG. 26

< embedding > < (log) header > < ( lay) header_frame >
[ Embedding description for the first section number node ] < mold >
[ Embedding description for the first header text node ] < mold >
< (lay) \ header_frame > < (log) \ header > < \ embedding >

< embedding > < (log) header > < (lay) header_frame >
[ Embedding description for the second section number node ] < mold >
[ Embedding description for the second section header text node ] < mold >
< (lay) \ header_frame > < (log) \ header > < \ embedding >

FIG. 27

< embedding > < (log) sec_num > < (lay) block >
< (lay) line > 1 < (lay) \ line > < (lay) \ block >
< (log) \ sec_num > < \ embedding >

< embedding > < (log) sec_num > < (lay) block >
< (lay) line > 2 < (lay) \ line > < (lay) \ block >
< (log) \ sec_num > < \ embedding >

FIG. 28

< embedding> < (log) header_text > < (lay) block >
< (lay) line > DOCUMENT < (lay) \ line >
< (lay) line > ARCHITECTURE < (lay) \ line >
< (lay) \ block > < (log) \ header_text > < \ embedding >

< embedding> < (log) header_text > < (lay) block >
< (lay) line > DOCUMENT FILE < (lay) \ line >
< (lay) line > FORMAT < (lay) \ line >
< (lay) \ block > < (log) \ header_text > < \ embedding >

FIG. 29

< embedding> < (log) par > < (lay) block >
< (lay) line > The document editor ...... < (lay) \ line >
< (lay) line > ...... < (lay) \ line > < (lay) \ block >
< (lay) \ block > < (lay) line > ...... < (lay) \ line >
< (lay) line > ...... < (lay) \ line >
< (lay) \ block > < (log) \ par > < \ embedding >

< embedding> < (log) par > < (lay) block >
< (lay) line > The structured document ...... < (lay) \ line >
< (lay) line > ...... < (lay) \ line > < (lay) \ block >
< (log) \ par > < \ embedding >

< embedding> < (log) par > < (lay) block >
< (lay) line > Recently ...... < (lay) \ line >
< (lay) line > ...... < (lay) \ line > < (lay) \ block >
< (log) \ par > < \ embedding >

FIG. 30

```
< embedding> < (log) log_root > < (lay) lay_root >
< (lay) page > < (lay) body_frame > < (lay) left_col >
< (log) sec >
< embedding> < (log) header > < (lay) header_frame >
< embedding> < (log) sec_num > < (lay) block >
< (lay) line > 1 < (lay) \ line > < (lay) \ block >
< (log) \ sec_num > < \ embedding >
< mold >
< embedding > < (log) header_text > < (lay) block >
< (lay) line > DOCUMENT < (lay) \ line >
< (lay) line > ARCHITECTURE < (lay) \ line >
< (lay) \ block > < (log) \ header_text > < \ embedding >
< mold >
< (lay) \ header_frame > < (log) \ header > < \ embedding >
< mold >
< embedding > < (log) par > < (lay) block >
< (lay) line > The document editor ······ < (lay) \ line >
< (lay) line > ······ < (lay) \ line > < (lay) \ block >
< (lay) block > < (lay) line > ······ < (lay) \ line >
< (lay) line > ······ < (lay) \ line >
< (lay) \ block > < (log) \ par > < \ embedding >
< mold >
< (lay) \ left_col > < (lay) right_col >
< mold >
< embedding > < (log) par > < (lay) block >
< (lay) line > The Structured document ······ < (lay) \ line >
< (lay) line > ······ < (lay) \ line > < (lay) \ block >
< (log) \ par > < \ embedding >
< mold >
< (lay) \ right_col > < (lay) \ body_frame > < (lay) \ page >
< (lay) page > < (lay) body_frame > < (lay) left_col >
< (log) \ sec >
```

FIG. 31

```
< (log) sec >
< embedding> < (log) header > < (lay) header_frame >
< embedding> < (log) sec_num > < (lay) block >
< (lay) line > 2 < (lay) \ line > < (lay) \ block >
< (log) \ sec_num > < \ embedding >
< mold >
< embedding > < (log) header_text > < (lay) block >
< (lay) line > DOCUMENT FILE < (lay) \ line >
< (lay) line > FORMAT < (lay) \ line >
< (lay) \ block > < (log) \ header_text > < \ embedding >
< mold >
< (lay) \ header_frame > < (log) \ header > < \ embedding >
< mold >
< embedding > < (log) par > < (lay) block >
< (lay) line > Recently ...... < (lay) \ line >
< (lay) line > ...... < (lay) \ line > < (lay) \ block >
< (log) \ par > < \ embedding >
< mold >
< (lay) \ left_col > < (lay) right_col > < (lay) \ right_col >
< (lay) \ body_frame > < (lay) \ page > < (lay) \ lay_root >
< (log) sec > < (log) \ log_root >
< \ embedding >
```

FIG. 33

< embedding > < (log) log_root > < (lay) lay_root >
< (lay) page > < (lay) body_frame > < (lay) left_col >
[ Embedding description for the first English paragraph node ] < mold stream
[ Embedding description for the first Japanese paragraph node ] < mold stream
[ Embedding description for the second English paragraph node ] < mold stream
< (lay) \ left_col > < (lay) right_col >
< mold stream = J >
[ Embedding description for the second Japanese paragraph node ] < mold stream
< (lay) \ right_col > < (lay) \ body_frame > < (lay) \ page >
< (lay) page > < (lay) body_frame > < (lay) left_col >
< mold stream = E >
< (lay) \ left_col > < (lay) right_col >
< mold stream = J >
< (lay) \ right_col > < (lay) \ body_frame > < (lay) \ page >
< (lay) \ lay_root > < (log) \ log_root >
< \ embedding >

FIG. 34

< embedding stream = E > < (log) E_para > < (lay) E_block >
< (lay) line > AA ··· < (lay) \ line >
< (lay) line > ······ < (lay) \ line >
< (lay) \ E_block > < (log) \ E_para > < \ embedding >

FIG. 35

< embedding stream = J > < (log) J_para > < (lay) J_block >
< (lay) line > ああ ··· < (lay) \ line >
< (lay) line > ······ < (lay) \ line >
< (lay) \ J_block > < (log) \ J_para > < \ embedding >

FIG. 36

< embedding stream = E > < (log) E_para > < (lay) E_block >
< (lay) line > BB ··· < (lay) \ line >
< (lay) line > ······ < (lay) \ line >
< (lay) \ E_block > < (log) E_block >
< (lay) line > ······ < (lay) \ line >
< (lay) line > ······ < (lay) \ line >
< (lay) \ E_block > < (log) \ E_para > < \ embedding >

FIG. 37

< embedding stream = J > < (log) J_para > < (lay) J_block >
< (lay) line > いい ··· < (lay) \ line >
< (lay) line > ······ < (lay) \ line >
< (lay) \ J_block > < (log) J_block >
< (lay) line > ······ < (lay) \ line >
< (lay) line > ······ < (lay) \ line >
< (lay) \ J_block > < (log) \ J_para > < \ embedding >

FIG. 38

```
< embedding> < (log) log_root > < (lay) lay_root >
< (lay) page > < (lay) body_frame > < (lay) left_col >
< embedding stream = E > < (log) E_para > < (lay) E_block >
< (lay) line > AA < (lay) \ line >
< (lay) line > ······ < (lay) \ line >
< (lay) \ E_block > < (log) \ E_para > < \ embedding >
< mold stream = E >
< embedding stream = J > < (log) J_para > < (lay) J_block >
< (lay) line > ああ ······ < (lay) \ line >
< (lay) line > ······ < (lay) \ line >
< (lay) \ J_block > < (log) \ J_para > < \ embedding >
< embedding stream = E > < (log) E_para > < (lay) E_block >
< (lay) line > BB ······ < (lay) \ line >
< (lay) line > ······ < (lay) \ line >
< (lay) \ E_block > < (lay) E_block >
< (lay) line > ······ < (lay) \ line >
< (lay) line > ······ < (lay) \ line >
< (lay) \ E_block > < (log) \ E_para > < \ embedding >
< mold stream = E >
< (lay) \ left_col > < (lay) right_col >
< mold stream = J >
< embedding stream = J > < (log) J_para > < (lay) J_block >
< (lay) line > いい ······ < (lay) \ line >
< (lay) line > ······ < (lay) \ line >
< (lay) \ J_block > < (lay) J_block >
< (lay) line > ······ < (lay) \ line >
< (lay) line > ······ < (lay) \ line >
< (lay) \ J_block > < (log) \ J_para > < \ embedding >
< mold stream = J >
< (lay) \ right_col > < (lay) \ body_frame > < (lay) \ page >
< (lay) page > < (lay) body_frame > < (lay) left_col >
< mold stream = E >
< (lay) \ left_col > < (lay) right_col >
< mold stream = J >
< (lay) \ right_col > < (lay) \ body_frame > < (lay) \ page >
< (lay) \ lay_root > < (log) \ log_root >
< \ embedding >
```

FIG. 40

< embedding > < (log) log_root > < (lay) lay_root >
< (lay) page > < (lay) body_frame > < (lay) col >
[ Embedding description for the first paragraph node ] < mold stream = P >
[ Embedding description for the first footnote node ]
[ Embedding description for the second paragraph node ] < mold stream = P >
< (lay) col > < (lay) footnote_area >
< mold stream = F >
[ Embedding description for the second footnote node ] < mold stream = F >
< (lay) \ footnote_area > < (lay) \ body_frame >
< (lay) page > < (lay) \ lay_root > < (log) \ log_root >
< \ embedding >

FIG. 41

< embedding stream = P > < (log) para > < (lay) block >
< (lay) line > Paragraph 1 ... < (lay) \ line >
< (lay) line > ...... < (lay) \ line >
< (lay) \ block > < (log) \ para > < \ embedding >

FIG. 42

< embedding stream = F > < (log) footnote >
< (lay) footnote_block >
< (lay) line > Note 1 ... < (lay) line >
< (lay) line > ...... < (lay) \ line >
< (lay) \ footnote_block > < (log) \ footnote >
< \ embedding >

FIG. 43

< embedding stream = P > < (log) para > < (lay) block >
< (lay) line > Paragraph 2 ... < (lay) \ line >
< (lay) line > ...... < (lay) \ line >
< (lay) \ block > < (log) \ para > < \ embedding >

FIG. 44

< embedding stream = F > < (log) footnote >
< (lay) footnote_block >
< (lay) line > Note 2 ··· < (lay) \ line >
< (lay) line > ······ < (lay) \ line >
< (lay) \ footnote_block > < (log) \ footnote >
< \ embedding >

FIG. 45

< embedding > < (log) log_root > < (lay) lay_root >
< (lay) page > < (lay) body_frame > < (lay) col >
< embedding stream = P > < (log) para > < (lay) block >
< (lay) line > Paragraph 1 ··· < (lay) \ line >
< (lay) line > ······ < (lay) \ line >
< (lay) \ block > < (log) \ para > < \ embedding >
< mold stream = P >
< embedding stream = F > < (log) footnote >
< (lay) footnote_block >
< (lay) line > Note 1 ··· < (lay) \ line >
< (lay) line > ······ < (lay) \ line >
< (lay) \ footnote_block > < (log) \ footnote >
< \ embedding >
< embedding stream = P > < (log) para > < (lay) block >
< (lay) line > Paragraph 2 ··· < (lay) \ line >
< (lay) line > ······ < (lay) \ line >
< (lay) \ block > < (log) \ para > < \ embedding >
< mold stream = P >
< (lay) \ col > < (lay) footnote_area >
< mold stream = F >
< embedding stream = F > < (log) footnote >
< (lay) footnote_block >
< (lay) line > Note 2 ··· < (lay) \ line >
< (lay) line > ······ < (lay) \ line >
< (lay) \ footnote_block > < (log) \ footnote >
< \ embedding >
< mold stream = F >
< (lay) \ footnote_area > < (lay) \ body_frame >
< (lay) \ page > < (lay) \ lay_root > < (log) \ log_root >
< \ embedding >

DOCUMENT PROCESSING APPARATUS FOR PROCESSING A STRUCTURED DOCUMENT USING EMBEDDING NODES AND MOLD NODES

BACKGROUND OF THE INVENTION

The present invention relates to a document processing apparatus for processing a structured document by using a computer.

In recent years, with the development of document editors and document formatters, the document expression forms have evolved from the flat text that consists only of character strings to forms which can express more information. The understanding that a structured document is effective in expressing a document is now being widely accepted. In the structured document, a structure is introduced into a document to facilitate the construction, layout, retrieving, reuse, etc. of the document. ODA (ISO 8613) and SGML (ISO 8879), which are international standards for document expression forms, have been established based on the concept of the structured document.

A structured document basically consists of a logical structure and a layout structure, which will be described below. The logical structure is a tree structure consisting of logical elements such as a chapter, section, paragraph, footnote and figure. Elements of a structured document are called logical nodes. An advantage of introducing a logical structure into a document is an expanded range of document processing. For example, various kinds of processing such as automatic generation of a table of contents, automatic determination of chapter numbers, section numbers, etc. and generation of a document header list from a group of documents become possible. Further, a complicated layout can easily be specified by specifying a layout for logical components.

An end node of a logical structure is characters, a bit map, etc., which are seen when a document is displayed or printed. It can be said that a structured document is a document divided by a logical structure.

A document having a logical structure is hereinafter referred to as a "document of processable form" after ODA. Various kinds of processing such as editing and layout can be performed on a document of processable form. However, not having layout information such as pages and columns, a document of processable form cannot be displayed or printed.

FIGS. 2A and 2B show an example of a document, and FIG. 3 shows a document structure of this document. The document of FIGS. 2A and 2B consists of two sections each having a header. The first section has two paragraphs and the second section has one paragraph. The two sections are represented by respective section nodes. The header of each section is represented by a header node. Each header node has a section number node representing a section number and a header text node representing a header text. Each paragraph is represented by a paragraph node, which has a certain number of end nodes (characters).

The layout structure is a tree structure consisting of rectangular regions such as pages, columns and blocks. Elements of a layout structure are called layout nodes. A document having a layout structure can be displayed and printed. As in the case of a logical structure, an end node of a layout structure includes characters, a bit map, etc., which are seen when a document is displayed or printed. A document having a layout structure is hereinafter referred to as a "document of formatted form" after ODA. Having layout information, a document of formatted form can be displayed and printed. However, a document of formatted form does not have a logical structure, it cannot be subjected to re-editing or re-layout.

FIG. 4 shows a layout structure of the document of FIGS. 2A and 2B. FIG. 5 shows a corresponding relationship between the logical structure and the layout structure of the document of FIGS. 2A and 2B. The document of FIGS. 2A and 2B consists of two pages, and each page is represented by the left and right columns. A header is allocated to each of the left column of page 1 and the left column of page 2. In the header portions, the section number is constituted of one line and the header text is constituted of two lines. The first paragraph of the first section bridges the left and right columns of page 1. The second paragraph of the first section is allocated to the right column of page 1. The first paragraph of the second section is allocated to the left column of page 2.

The two pages of the above document is represented by respective page nodes. The printing plate area of each page is represented by a printing plate frame node. The left column and right column of each page are represented by a left column node and a right column node, respectively. The regions occupied by the headers that are allocated to the left column of page 1 and the left column of page 2 are represented by header frame nodes. The section number and the header text that constitute the header are represented by block nodes. The block node corresponding to the section number has one line node, and the block node corresponding to the header text has two line nodes. The region of the left column occupied by the first paragraph of the first section is represented by one block node, and the region of the right column occupied by the same paragraph is represented by another block node. The block node representing the region occupied by the second paragraph of the first section is allocated to the right column of page 1. Further, the block node representing the region occupied by the first paragraph of the second section is allocated to the left column of page 2. Each block node consists of several line nodes. For simplification, only two lines nodes are shown for each block node in FIGS. 4 and 5. Each line node has a certain number of end nodes (characters).

A single document can have both of a logical structure and a layout structure. A document having both structures is called a "document of formatted processable form". A document of formatted processable form benefits from both processable form and formatted form, and is suitable for processing such as editing, layout, display and printing. In a document of formatted processable form, end nodes of a logical structure are identical to those of a layout structure. That is, characters, a bit map, etc. are not only an end node of a logical structure but also an end node of a layout structure. However, such end nodes as a page number as generated by layout processing belong only to a layout structure, i.e., do not belong to a logical structure.

There are some types of logical nodes whose counterpart partial layout structures are predetermined. For example, it is predetermined that a logical node representing a section header should be allocated to a partial layout structure representing a section header frame. It is predetermined that a logical node representing a figure (including a caption) should be allocated to a partial layout structure representing a figure frame. It is predetermined that a logical node representing a paragraph should be allocated to a partial layout structure representing a text block consisting of an array of lines. Further, it is predetermined that a logical node (logical root node) representing the entire document should be allocated to a layout node (layout root node) representing the entire document. These logical nodes are called unit logical nodes, which serve as fundamental processing units when a system performs layout of a document.

A consideration will be made of a partial layout structure that is generated so as to be allocated to a unit logical node. The top node of such a partial layout structure is called a unit layout node. There exists a direct correspondence between the unit logical node and the unit layout node. For example, one unit layout node representing a section header frame corresponds to one unit logical node representing a section header. One unit layout node representing a figure frame corresponds to one unit logical node representing a figure. A partial logical structure whose top node is a unit logical node is entirely accommodated in a partial layout structure whose top node is a unit layout node. The other part of the logical structure is not allocated to this partial layout structure. For example, a partial logical structure representing a section header is accommodated in a partial layout structure representing a section header frame, and the other part is not allocated to this partial layout structure.

A plurality of unit layout nodes correspond to one unit logical node only when a division occurs due to a page boundary or a column boundary. For example, assume here that one paragraph is divided into two text blocks by a page boundary. In this case, two divided unit layout nodes (text blocks) correspond to one unit logical node representing this paragraph. Even in such a case, a partial logical structure (single tree) having a unit logical node as its top is entirely accommodated in partial layout structures (a plurality of trees) having unit layout nodes as their tops.

FIG. 6 shows a relationship between the unit logical nodes and the unit layout nodes of the document shown in FIGS. 2A and 2B. The logical root node, header nodes, section number nodes, header text nodes and paragraph nodes are unit logical nodes. The layout root node, header frame nodes, and block nodes are unit layout nodes. The logical root node corresponds to the layout root node, and the header nodes correspond to the header frame nodes. The other unit logical nodes correspond to the block nodes. For example, the paragraph node representing the first paragraph of the first section corresponds to the two block nodes.

Consideration should be given to unit logical nodes that are subordinate to a certain unit logical node without any intervening unit logical node. A list of those unit logical nodes as arranged in the depth-preference order is called a "stream." In the case of the document shown in FIGS. 2A and 2B, among the unit logical nodes subordinate to the logical root node that is a unit logical node, the unit logical nodes subordinate thereto without any intervening unit logical node, i.e., the header node of the first section, the first and second paragraph nodes of the first section, the header node of the second section, the paragraph node of the second section are arranged to form a list, i.e., a stream. Although the section number node is a unit logical node, it is not included in this stream because it is subordinate to the logical root node via another unit logical node, i.e., the header node. However, two arrangements of the unit logical nodes subordinate to the header node, more specifically, an arrangement of the section number node and the header text node of the first section and an arrangement of the section number node and the header text node of the second section are other streams. In FIG. 3, the respective streams are indicated by thick lines.

A case where there is only one stream below one unit logical node will now be considered. This type of document is called a single stream document. In a single stream document, unit layout nodes appear in a layout structure in the same order as the corresponding unit logical nodes appear in the stream. In the case of the document shown in FIGS. 2A and 2B, as shown in FIGS. 3 and 5, the block node corresponding to the second paragraph node of the first section appears after the two block nodes corresponding to the first paragraph node of the first section. Although both of the unit logical nodes and the unit layout nodes are nested, the above rule holds at every nesting level. Therefore, end nodes of a logical structure always appear in the same order as end nodes of a layout structure. In other words, if end node A appears before end node B in a logical structure, end node A also appears before end node B in a layout structure.

Next, consideration will be given to the case where there exist a plurality of streams below one unit logical node. That is, it may be the case that unit logical nodes that are subordinate to one unit logical node without any intervening unit logical node do not wholly belong to one stream, but belong to a plurality of streams. In such a case, it is predesignated to which stream each unit logical node belongs, by a "stream attribute" of the node. This type of document is called a multiple stream document. In a multiple stream document, end nodes of a logical structure appear in an order different than end nodes of a layout structure.

FIGS. 7A and 7B show an example of a multiple stream document. In this example, a Japanese text and a corresponding English text are arranged in juxtaposition with English paragraphs placed in the left columns and Japanese paragraphs placed in the right columns. This document has two English paragraphs and two Japanese paragraphs.

FIG. 8 shows a logical structure of the multiple stream document of FIGS. 7A and 7B. The logical structure of this document is expressed by two English paragraph nodes corresponding to the two English paragraphs and two Japanese paragraph nodes corresponding to the two Japanese paragraphs. Each paragraph node has a certain number of end nodes (characters). A stream attribute "E" is designated for the English paragraph nodes, and a stream attribute "J" is designated for the Japanese paragraph nodes. That is, this document has the two streams, i.e., the stream consisting of the two English paragraph nodes and the stream consisting of the two Japanese paragraph nodes. In FIG. 8, the streams respective are indicated by thick lines.

FIG. 9 shows a layout structure of the multiple stream document shown in FIGS. 7A and 7B. As shown in FIGS. 7A and 7B, this document consists of two pages, each of which is represented by a page node. The printing plate area of each page is represented by a printing plate frame node. The left column and the right column of each page are represented by a left column node and a right column node, respectively. The stream of the English paragraphs is allocated to the left columns of page 1 and page 2. The region occupied by the first English paragraph is represented by one English block node, which is subordinate to the left column node of page 1. The second English paragraph is divided into two parts, which are represented by two English block nodes. The first English block node is subordinate to the left column node of page 1, and the second English block node is subordinate to the left column node of page 2.

The stream of the Japanese paragraphs is allocated to the right columns of page 1 and page 2. The region occupied by the first Japanese paragraph is represented by one Japanese block node, which is subordinate to the right column node of page 1. The second Japanese paragraph is divided into two parts, which are represented by two Japanese block nodes. The first Japanese block node is subordinate to the right column node of page 1, and the second Japanese block node is subordinate to the right column node of page 2. Each block node consists of a certain number of line nodes. For simplicity, only two line nodes are shown for each block node in FIG. 9. Each line is represented by a node.

FIG. 10 shows a relationship between the logical structure and the layout structure of the multiple stream document of FIGS. 7A and 7B. It is seen that the end nodes of the logical structure appear in the order different than the end nodes of the layout structure. The Japanese characters belonging to the first Japanese paragraph appear in the right column of page 1 in the layout structure. On the other hand, while the head English character of the second English paragraph appears immediately after the first Japanese paragraph in the logical structure, it appears in the left column of page 1, i.e., before the first Japanese paragraph.

FIG. 11 shows a relationship between the unit logical nodes and the unit layout nodes in the multiple stream document of FIGS. 7A and 7B. The Japanese paragraph nodes are unit logical nodes, and the Japanese block nodes are corresponding layout nodes. Similarly, the English paragraph nodes are unit logical nodes, and the English block nodes are corresponding layout nodes. The Japanese block node corresponding to the node first appearing in the stream among the two Japanese paragraph nodes also appears first in the layout structure. Similarly, the English block node corresponding to the node first appearing in the stream among the two English paragraph nodes also appears first in the layout structure. On the other hand, with respect to the first Japanese paragraph node and the second English paragraph node, while the first Japanese paragraph node appears first in the logical structure, the English block node corresponding to the second English paragraph node appears first in the layout structure. As is understood from this example, the order of node appearance in the logical structure is the same as that in the layout structure only in the case where the nodes belong to the same stream. If nodes belong to different streams, it is not assured that they appear in a logical structure in the same order as in a layout structure. Therefore, it may be the case that the order of appearance of end nodes in a logical structure is different from that in a layout structure.

The multiple stream document is further considered using as an example a document having footnotes, which is shown in FIG. 12. FIG. 13 shows a logical structure of the document having footnotes of FIG. 12. The document shown in FIG. 12 has two paragraphs and two footnotes, which are represented by paragraph nodes and footnote nodes, respectively. Each of the paragraph nodes and the footnote nodes has a certain number of end nodes (characters). For example, a stream attribute "P" is specified for the paragraph nodes and "F" is specified for the footnote nodes. Therefore, this document has a stream consisting of the two paragraphs and a stream consisting of the two footnotes. The respective streams are indicated by thick lines in FIG. 13.

FIG. 14 shows a layout structure of the document of FIG. 12. The document shown in FIG. 12 is constituted of only one page. The page and the printing plate area are represented by a page node and a printing plate frame node, respectively. The printing plate area consists of a column and a footnote region. The column is represented by a column node, and the footnote region is represented by a footnote region node. The stream of paragraphs is allocated to the column. The regions occupied by the first and second paragraphs are represented by respective block nodes. Both block nodes are subordinate to the column node. The stream of footnotes is allocated to the footnote region. The regions occupied by the first and second footnotes are represented by respective footnote block nodes. Both footnote block nodes are subordinate to the footnote region node. Each block node consists of a certain number of line nodes. For simplicity, only two line nodes are shown for each block node in FIG. 14.

FIG. 15 shows a relationship between the logical structure and the layout structure of the document having footnotes of FIG. 12. While in the logical structure the first footnote appears immediately after the first paragraph, in the layout structure the second paragraph appear immediately after the first paragraph. In this manner, the order of appearance of end nodes in the logical structure is different from that in the layout structure.

FIG. 16 shows a relationship between the unit logical nodes and the unit layout nodes of the document having footnotes of FIG. 12. The paragraph nodes are unit logical nodes, and the block nodes are corresponding layout nodes. Similarly, the footnote nodes are unit logical nodes, and the footnote block nodes are corresponding layout nodes. The nodes corresponding to each other are indicated by thick lines.

WYSIWYG (what you see is what you get) editors, which are dominant in present document processing schemes, internally express a document in a formatted processable form. That is, both of a logical structure and a layout structure are retained in the main memory of a computer. It is therefore possible to express information for any kinds of processing including editing, layout, display and printing. However, it is not easy to express all of such information so that it can be processed more efficiently and more conveniently. In particular, it is difficult to retain such information in the form of a file or data on a communications network. Conventionally proposed expression schemes will be described below by using as an example the document shown in FIGS. 2A–4.

First, a consideration will be made of a case of expressing a document in a processable form. This expression scheme is now being used most commonly. As described above, only a logical structure is expressed in the processable form; that is, a layout structure is not expressed. A logical structure is expressed by repeatedly using expressions of logical nodes. The order of appearance of logical nodes is equal to the order obtained when the logical structure is traced in the depth-preference order.

FIG. 17 shows an example of a file format of a document of processable form. In this example, the logical structure shown in FIG. 3 is expressed according to SGML. According to SGML, one logical node is interposed between a start tag and an end tag. The start tag is a character string interposed between "<" and ">," and the end tag is a character string interposed between "<\" and ">."

A start tag <log_root> appearing at the head of the format and an end tag <\log_root> appearing at the end of the format indicate that the portion interposed between those tags is a logical root node. The second start tag <sec> and an end tag <\sec> appearing in a middle portion indicate that the portion interposed between those tags is a section node. The third start tag <header> and an end tag <\header> indicate that the portion interposed between those tags is a header node. The fourth start tag <sec_num> and an end tag <\sec$_{13}$ num> indicate that the portion interposed between those tags is a section number node. A character "1" is an end node. The portion interposed between a start tag <header₁₃ text> and an end tag <\header_text> is a header text node, and a character string "DOCUMENT ARCHITECTURE" is a body of the heading text node. The portion interposed between a start tag <para> and an end tag <\para> is a paragraph node, and characters "The document editor ..." are end nodes. A description for the remaining tags are omitted because the same thing applies thereto.

A document expressed in this processable form is convenient when its logical structure is processed by a program other than a particular editor. With the processable form, scanning in the depth-preference order can be performed easily, which is very advantageous because there are many kinds of processing which can be enabled by scanning a logical structure in the depth-preference order. Scanning a logical structure in the depth-preference order can be performed by sequentially reading tags and end nodes (characters) from a file, and effecting pushing to the stack for a start node and popping from the stack for an end node. A program that performs processing by use of the scanning in the depth-preference order need not develop the entire logical structure to a memory. Therefore, no means for memory management is necessary, which facilitates programming. Further, the efficiency of processing is improved.

However, with the processable form, only a logical structure can be expressed; that is, a layout structure cannot be expressed. Layout processing is needed to obtain a layout structure. Since layout processing is complex, it requires a lot of time. Therefore, it takes long time to display or print a document of processable form that is stored in a file.

A layout structure may also be necessary for uses other than display and printing, such as retrieving. For example, a layout structure is needed to retrieve a document under a condition "a figure is allocated to the left column." This example particularly takes long time because layout processing needs to be performed on a plurality of documents.

The above problem would be solved by using both of the processable form and the formatted form. In this case, a logical structure is expressed in a processable form as shown in FIG. 17, for instance, and a layout structure is also expressed in the similar manner. Expressions of the logical structure and the layout structure may be stored either in separate files or in the same file.

The layout structure is expressed in approximately the same manner as the logical structure. FIG. 18 shows an example of a file format of a document of formatted form, which corresponds to the layout structure shown in FIG. 4. A start tag <lay_root> appearing at the head of the format and an end tag appearing at the end of the format indicate that the portion interposed between those tags is a layout root node. The second start tag  and an end tag <\page> appearing in a middle portion indicate that the portion interposed between those tags is a page node. A start tag <body_frame> appearing immediately after the start tag  of the page node and an end tag <\body_frame> appearing immediately before the end tag <\page> of the page node indicate a printing plate frame node of this page node. A start tag <left-col> appearing immediately after the start tag <body-frame> of the printing plate frame node indicates start of a left column node. The subsequently appearing start tag <header_frame> indicates start of a header frame node allocated to the left column. Each of the subsequently appearing pairs of a start tag <block> and an end tag <\block> indicates a block node. The first two block nodes belong to the header frame node, and the subsequent block node belongs to the left column node. A start tag <line> and an end tag <\line> indicate a line node belonging to a block node. A character string "DOCUMENT," "ARCHITECTURE," etc. are end nodes. A description for page 2 is omitted because the same thing applies thereto.

According to the above scheme, it is possible to easily obtain necessary information to perform editing, layout, display, printing, etc. Intended processing can be performed by reading the necessary one of a logical structure and a layout structure stored in a file. For processing that requires only the logical structure, it is sufficient to refer to only the logical structure while disregarding the layout structure. The logical structure can easily be scanned in the depth-preference order as in the case of the expression scheme of processable form. Similarly, for processing that requires only the layout structure, it is sufficient to refer to only the layout structure while disregarding the logical structure. The layout structure can be scanned in the depth-preference order in the same manner as the logical structure.

However, it should be considered that a logical structure and a layout structure share end nodes, as described above. In the above expression scheme, all the end nodes are shared by a logical structure and a layout structure. Since all of characters, bit maps, etc. of a document become end nodes, the above expression scheme is very low in the efficiency of space utilization.

Another problem is that a corresponding relationship between unit logical nodes and unit layout nodes cannot be expressed. Therefore, this corresponding relationship cannot be used in retrieving etc. For example, a retrieving operation "search for a passage in which a figure of section 2 is allocated to the left column" not only needs both of a logical structure and a layout structure, but also information that a figure node of the logical structure corresponds to a figure frame node of the layout structure.

ODA prescribes the expression scheme of the formatted processable form. This expression scheme expresses both of a logical structure and a layout structure while avoiding sharing of end nodes. More specifically, a logical structure excluding end nodes, a layout structure excluding end nodes, and the end nodes are expressed separately.

FIGS. 19–21 shows an example of a file format of a document of formatted processable form, which uses SGML-type tags. Although FIGS. 19–21 are separate, the formats shown in these figures are actually arranged continuously in the order of figure numbers. The portion shown in FIG. 19 is an expression of logical nodes, and contains 12 logical nodes. How these logical nodes form a tree structure is expressed by attributes "id."

Since the head node has id of 3, it is the top of a tree structure, i.e., a logical root node. Since the subsequent node has id of 30, it is an oldest son node, i.e., a section node. Since the subsequent node has id of 300, it is an oldest son node of the section node, i.e., a header node. Since the subsequent node has id of 3000, it is an oldest son node of the header node, i.e., a section number node. Since the next node has id of 3001, it is a second son node of the node (header node) having id of 300, i.e., a header text node. Since the next node has id of 301, it is a second son node of the node (section node) having id of 30, i.e., the first paragraph node. Since the next node has id of 302, it is a third son node of the node (section node) having is of 30, i.e., the second paragraph node. A description for the remaining five nodes is omitted because the same thing applies thereto.

The portion shown in FIG. 20 is an expression of layout nodes, and contains 33 layout nodes. How these nodes form a tree structure is also expressed by attributes "id." Since the head node has id of 2, it is the top of a tree structure, i.e., a layout root node. Since the next node has id of 20, it is an oldest son node, i.e., a page node. A description for the remaining 31 nodes is omitted because the same thing applies thereto.

The portion shown in FIG. 21 is an expression of end nodes, and contains 14 end node lists. For example, the head list contains only one end node "1." The second list contains "D," "O," "C," ... The positions of these nodes in the logical structure and the layout structure are expressed by attributes log_id and lay_id. Since the list of the head end node has log_id of 30000, it is an oldest son node of the logical node having log_id of 3000 that is the section number node. At the same time, since the list of the head end node has lay_id of 20000000, it is an oldest son node of the layout node having lay_id of 2000000 that is the line node. The list of the second end node (log_id=30010, lay_id=20000100) belongs to the header text node (log_id=3001) and the block node (lay_id=2000010). It should be noted that all the end nodes "D," "O," "C," ... belong to this node. In each of the remaining lists, the positions in the logical structure and the layout structure and the contents of end nodes are expressed in the similar manner.

The above expression scheme can completely express both of logical nodes and layout nodes. Further, because end nodes are expressed only once, this scheme is superior in the efficiency of space utilization to the scheme of using both of the processable form and the formatted form.

However, in this scheme, since non-end nodes and end nodes of a logical structure are completely separated, logical nodes do not appear in the depth-preference order. In the above example, the end node belonging to the section number node does not appear immediately after the section number node, but appears far after it. Therefore, a program for scanning a logical structure in the depth-preference order needs to develop the logical structure in a memory. This results in lowered performance of the apparatus when the program is complex. Similarly, layout nodes do not appear in the depth-preference order. Therefore, a program for scanning a layout structure also becomes complex to deteriorate performance of the apparatus.

Further, the above expression scheme cannot express a corresponding relationship between unit logical nodes and unit layout nodes. Therefore, there still occur the same problems as in the case where the processable form and the formatted form are used together. The expression schemes of current ODA do not have information indicating this corresponding relationship.

SGML also prescribes an expression scheme CONCUR that expresses both of a logical structure and a layout structure. More specifically, according to CONCUR, tags representing a logical structure and tags representing a layout structure are mixed in a single document. End nodes are shared by the two structures.

FIGS. 22 and 23 show an example of a file format of a document according to CONCUR. The formats shown in these figures are actually arranged continuously in the order of figure numbers. A tag starting with "<(log)" is for a logical structure, and a tag starting with "<(lay)" is for a layout structure. By disregarding one of the logical structure and the layout structure, the other one is obtained.

This expression scheme can express both of a logical structure and a layout structure at the same time. Since end nodes are expressed only once, this scheme is superior in the efficiency of space utilization. Further, this scheme enables easier handling of a document than the formatted processable format according to ODA. By disregarding tags for a layout structure, a logical structure can be scanned in the depth-preference order. Conversely, a layout structure can be scanned in the depth-preference order by disregarding tags for a logical structure.

However, even in this expression scheme, a corresponding relationship between unit logical nodes and unit layout nodes is not expressed directly. Further, there exists no information indicating which logical nodes are unit logical nodes and which layout nodes are unit layout nodes. Only the orders of appearance of tags for a logical structure and layout structure indicate a corresponding relationship between a logical structure and a layout structure.

Another problem of the above expression scheme is incapability of expressing a document having a plurality of streams. According to "The SGML Handbook," Goldfarb, Oxford University Press, 1990, CONCUR has been designed to express documents in which a logical structure and a layout structure are approximately in one-to-one correspondence, for use in simple devices such as a word processor. This is the reason why the expression scheme according to CONCUR cannot express a document having a plurality of streams.

For example, the expression scheme according to CONCUR cannot express the document described above in connection with FIGS. 7–9 that has a plurality of streams. This is so because the order of appearance of end nodes when logical nodes are arranged in the depth-preference order is different from that when layout nodes are arranged in the depth-preference order. To express a logical structure, the character string "ああ ... " that is the end nodes belonging to the head Japanese paragraph node should be placed before the character string "BB ...." On the other hand, to express a layout structure, the character string "BB ..." should be placed before the character string "ああ ..." The recording method according to CONCUR has not solved this discrepancy.

SUMMARY OF THE INVENTION

The present invention has been made in view of the above circumstances, and has an object of providing a document processing apparatus which can improve the efficiency of space utilization, enables such processing as scanning in the depth-preference order to be performed easily, and can process general documents including documents having a plurality of streams.

Another object of the invention is to provide a document processing apparatus which can express a corresponding relationship between unit logical nodes and unit layout nodes.

According to the invention, a document processing apparatus for processing a structured document comprises:

document retaining means for retaining a structured document in which a logical structure and a layout structure are correlated with each other by using embedding nodes each being inserted between a unit logical node and a logical node immediately above the unit logical node and representing a corresponding relationship between the unit logical node and a unit layout node, and mold nodes provided in place of respective unit layout nodes; and document processing means capable of processing a partial logical structure of the document retained by the document retaining means together with a partial layout structure corresponding to the partial logical structure.

The document processing means may include logical structure extracting means for extracting the logical structure from the document retained by the document retaining means, layout structure extracting means for extracting the layout structure from the document retained by the document retaining means, and embedding extracting means for extracting, from the document retained by the document retaining means, a partial logical structure and a partial layout structure that are subordinate to an embedding node that satisfies a specified condition.

According to the invention, a corresponding relationship between the unit logical nodes and the unit layout nodes is clearly indicated by introducing the embedding nodes into the document retained by the document retaining means. Further, the problem of node order reversal due to the existence of a plurality of streams is solved by introducing the mold nodes. As a result, it becomes possible for the document processing means to perform an operation on a unit logical node basis or a unit layout node basis, and to process a variety of general documents, even a document having a plurality of streams. For example, the extraction of the logical structure by the logical structure extracting means and the extraction of the layout structure by the layout structure extracting means can be performed, for instance, by scanning in the depth-preference order without storing the entire document into a memory. Further, the embedding extracting means can extract, for subsequent processing, a partial logical structure and a partial layout structure that correspond to each other.

BRIEF DESCRIPTION OF THE DRAWINGS

FIG. 17 shows an example of a file format of a document of processable form;

FIG. 18 shows an example of a file format of a document of formatted form;

FIGS. 19-21 show an example of a file format of a document of formatted processable form;

FIGS. 22 and 23 show another example of a file format of a document of formatted processable form;

FIG. 25 shows an example of an embedding description for the logical root node of the document of FIGS. 2A and 2B;

FIG. 26 shows an example of embedding descriptions for embedding nodes b and g corresponding to the respective header nodes of the document of FIGS. 2A and 2B;

FIG. 27 shows an example of embedding descriptions for embedding nodes c and h corresponding to the respective section number nodes of the document of FIGS. 2A and 2B;

FIG. 28 Shows an example of embedding descriptions for embedding nodes d and i corresponding to the respective header text nodes of the document of FIGS. 2A and 2B;

FIG. 29 shows an example of embedding descriptions for embedding nodes e, f and g corresponding to the respective paragraph nodes of the document of FIGS. 2A and 2B;

FIGS. 30 and 31 show an example of an embedding description for the entire document of FIGS. 2A and 2B;

FIG. 33 shows an example of an embedding description for the logical root node of the document having a plurality of streams of FIGS. 7A and 7B;

FIG. 34 shows an example of an embedding description for embedding node b corresponding to the first English paragraph node of the document having a plurality of streams of FIGS. 7A and 7B;

FIG. 35 shows an example of an embedding description for embedding node c corresponding to the first Japanese paragraph node of the document having a plurality of streams of FIGS. 7A and 7B;

FIG. 36 shows an example of an embedding description for embedding node d corresponding to the second English paragraph node of the document having a plurality of streams of FIGS. 7A and 7B;

FIG. 37 shows an example of an embedding description for embedding node e corresponding to the second Japanese paragraph node of the document having a plurality of streams of FIGS. 7A and 7B;

FIG. 38 shows an example of an embedding description for the entire document having a plurality of streams of FIGS. 7A and 7B;

FIG. 40 shows an example of an embedding description for the logical root node of the document having footnotes of FIG. 12;

FIG. 41 shows an example of an embedding description for embedding node b corresponding to the first paragraph node of the document having footnotes of FIG. 12;

FIG. 42 shows an example of an embedding description for embedding node c corresponding to the first footnote node of the document having footnotes of FIG. 12;

FIG. 43 shows an example of an embedding description for embedding node d corresponding to the second paragraph node of the document having footnotes of FIG. 12;

FIG. 44 shows an example of an embedding description for embedding node e corresponding to the second footnote node of the document having footnotes of FIG. 12;

FIG. 45 shows an example of an embedding description for the entire document having footnotes of FIG. 12;

DESCRIPTION OF THE PREFERRED EMBODIMENTS

Figure 1:
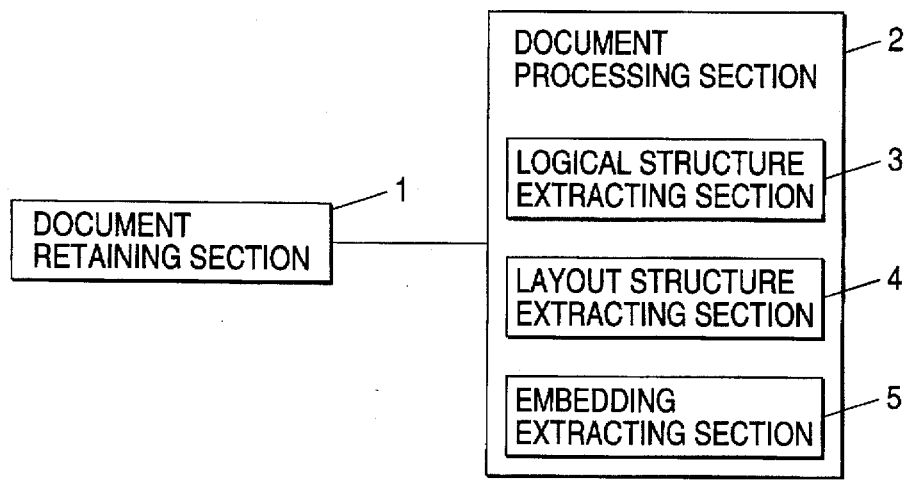
FIG. 1 is a block diagram showing a document processing apparatus according to an embodiment of the present invention.

FIG. 1 is a block diagram showing a document processing apparatus according to an embodiment of the present invention. In FIG. 1, reference numeral 1 denotes a document retaining section; 2, a document processing section; 3, a logical structure extracting section; 4, a layout structure extracting section; and 5, an embedding extracting section. A structured document is retained by the document retaining section 1. The retained document is a document of formatted processable form having a logical structure and a layout structure, in which, as described later, unit logical nodes and unit layout nodes are correlated using embedding nodes that are inserted between the unit logical nodes and logical nodes immediately above the unit logical nodes and mold nodes that are used in place of the unit layout nodes.

The document processing section 2 processes the document retained by the document retaining section 1. The document processing section 2 may include processing sections such as the logical structure extracting section 3, layout structure extracting section 4 and embedding extracting section 5. The logical structure extracting section 3 extracts only the description of a logical structure of the document while sequentially reading the document from the document retaining section 1. The layout structure extracting section 4 extracts only the description of a layout structure of the document while sequentially reading the document from the document retaining section 1. The embedding extracting section 5 extracts only a partial structure that satisfies a given condition from the document while sequentially reading the document from the document retaining section 1. It is not necessary that all of the above processing sections be provided. Conversely, a processing section for another processing may be added. For example, there may be provided a processing section for generating a new document by reusing the existing document in accordance with the logical structure as extracted by the logical structure extracting section 3, or a processing section for performing output processing on the document in accordance with the layout structure as extracted by the layout extracting section 4. Further, there may be provided a processing section for processing unit logical nodes, and other various processing sections.

For example, a specific configuration of the document processing apparatus according to the embodiment of the invention can be implemented as a computer such as a workstation. In this case, a storage means of a computer can be used as the document retaining means 1. Alternatively, the document processing apparatus can be implemented such that a computer and a storage means are separately provided and connected through a communications network. Further, the document processing section 2 can be implemented as a computer main body.

A description will be made of the document retained by the document retaining section 1 of the document processing apparatus of this embodiment. As described above, the document retained by the document retaining section 1 is a document of formatted processable form having a logical structure and a layout structure, in which unit logical nodes and unit layout nodes are correlated using embedding nodes that are inserted between the unit logical nodes and logical nodes immediately above the unit logical nodes and mold nodes that are used in place of the unit layout nodes.

Figure 2A:
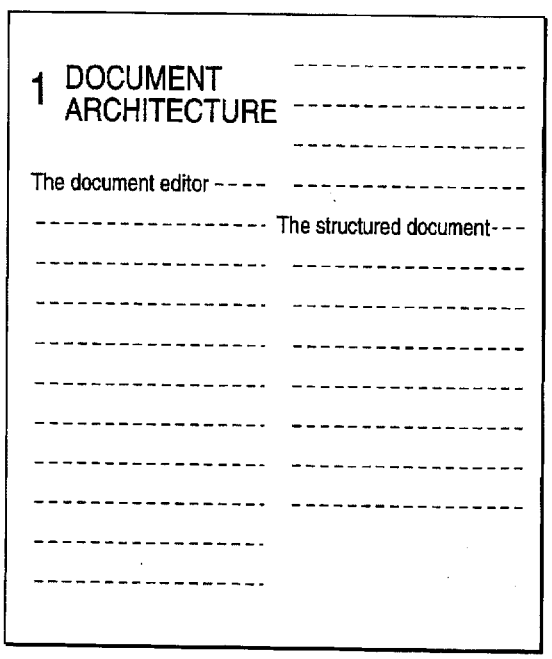
FIGS. 2A and 2B show an example of a document.
Figure 2B:
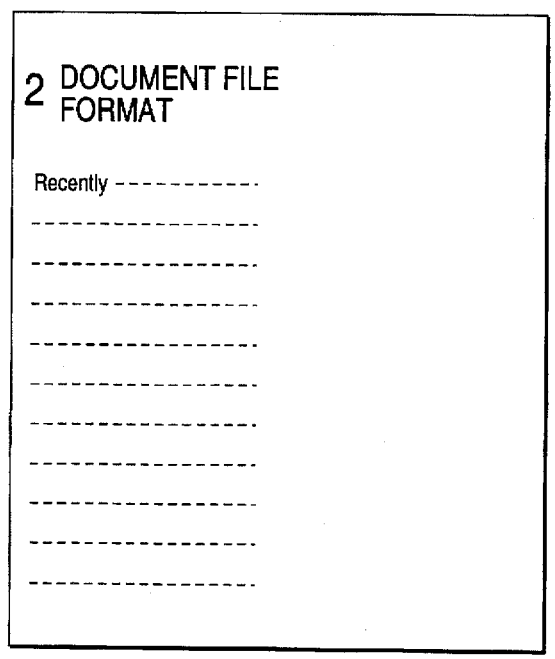
Figure 3:
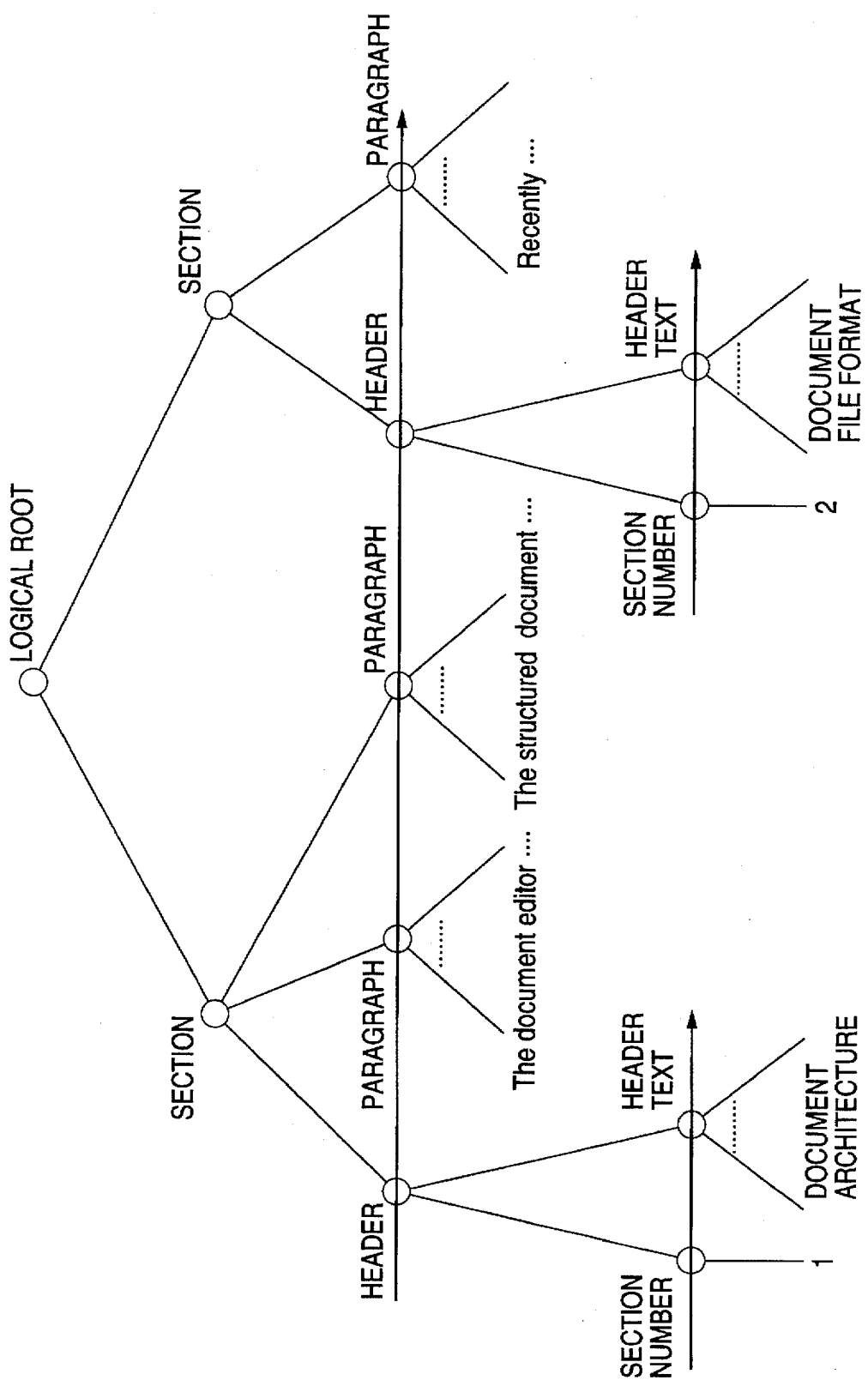
FIG. 3 shows a logical structure of the document of FIGS. 2A and 2B.
Figure 4:
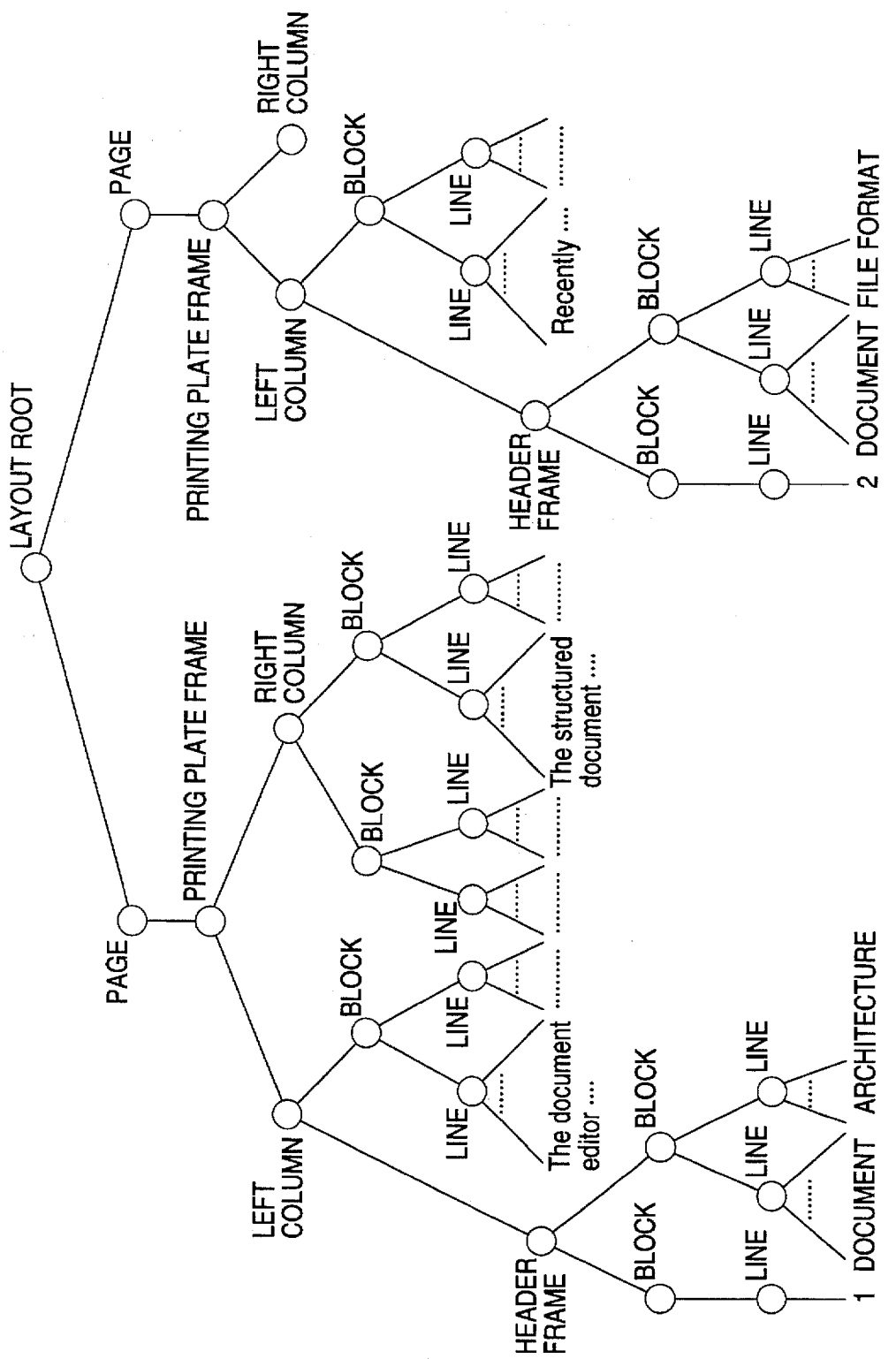
FIG. 4 shows a layout structure of the document of FIGS. 2A and 2B.
Figure 5:
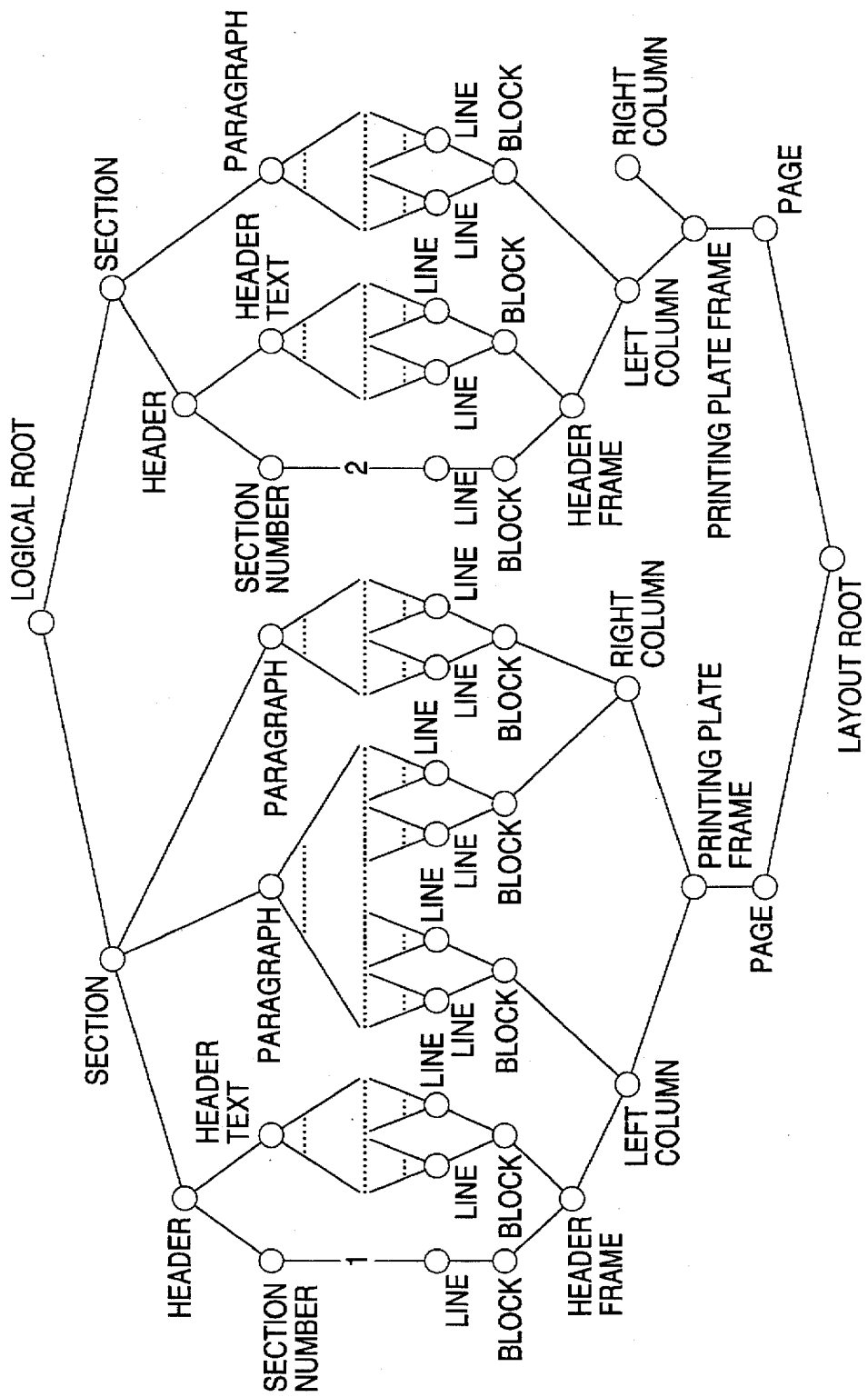
FIG. 5 shows a relationship between the logical structure and the layout structure of the document of FIGS. 2A and 2B.
Figure 6:
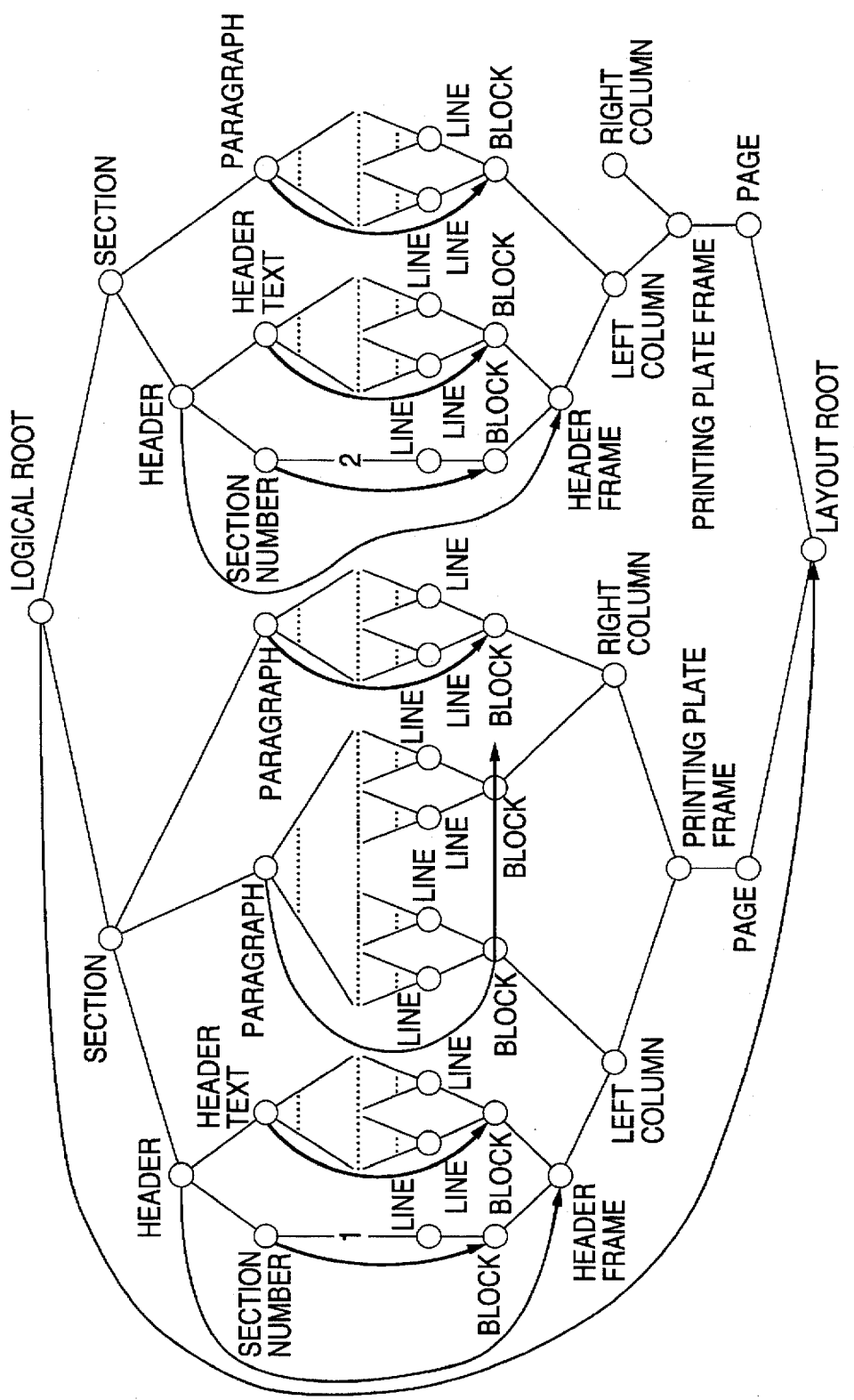
FIG. 6 shows a relationship between unit logical nodes and unit layout nodes of the document of FIGS. 2A and 2B.
Figure 24:
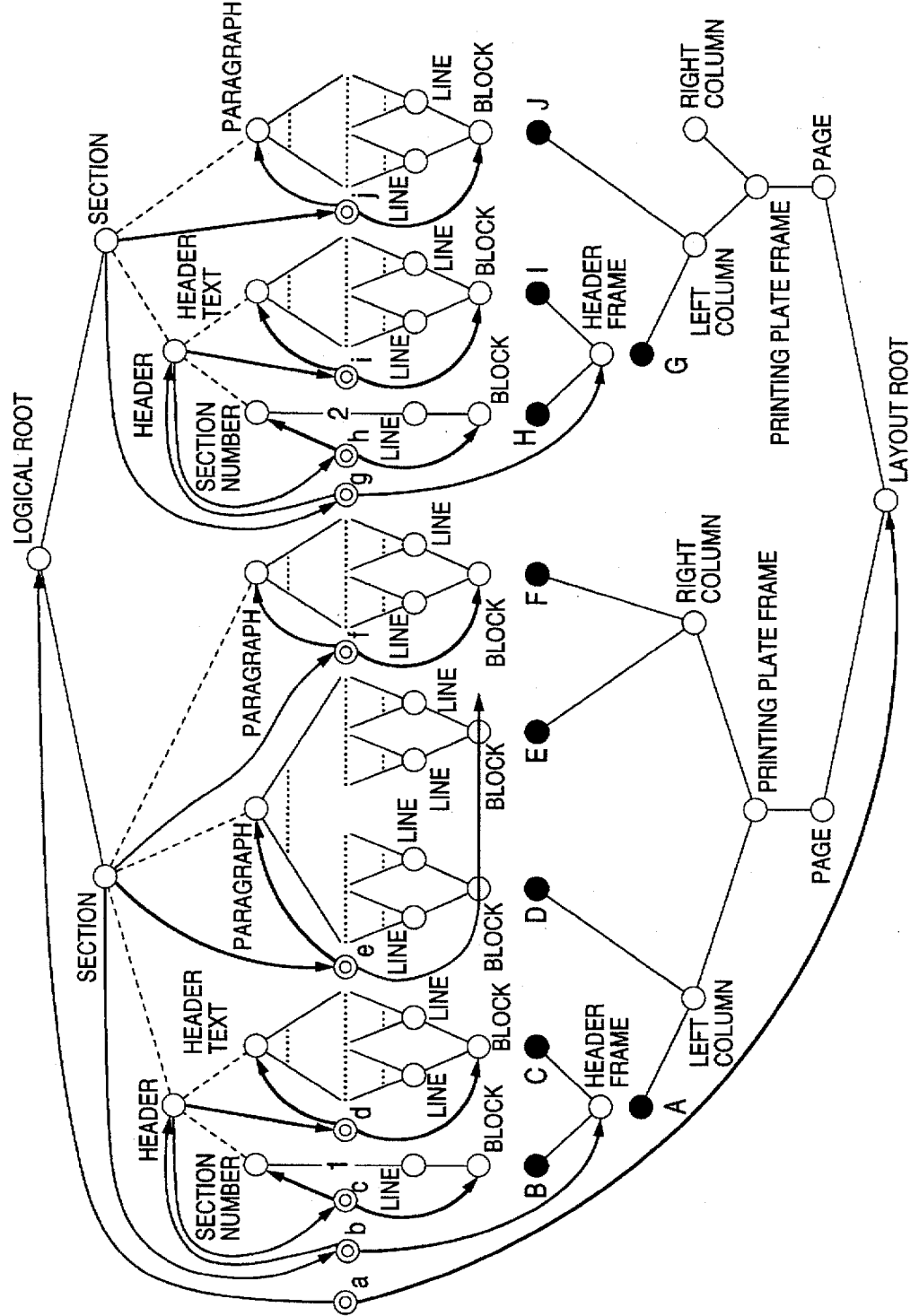
FIG. 24 shows a relationship between a logical structure and a layout structure of the document of FIGS. 2A and 2B into which embedding nodes and mold nodes have been introduced.
Figure 32:
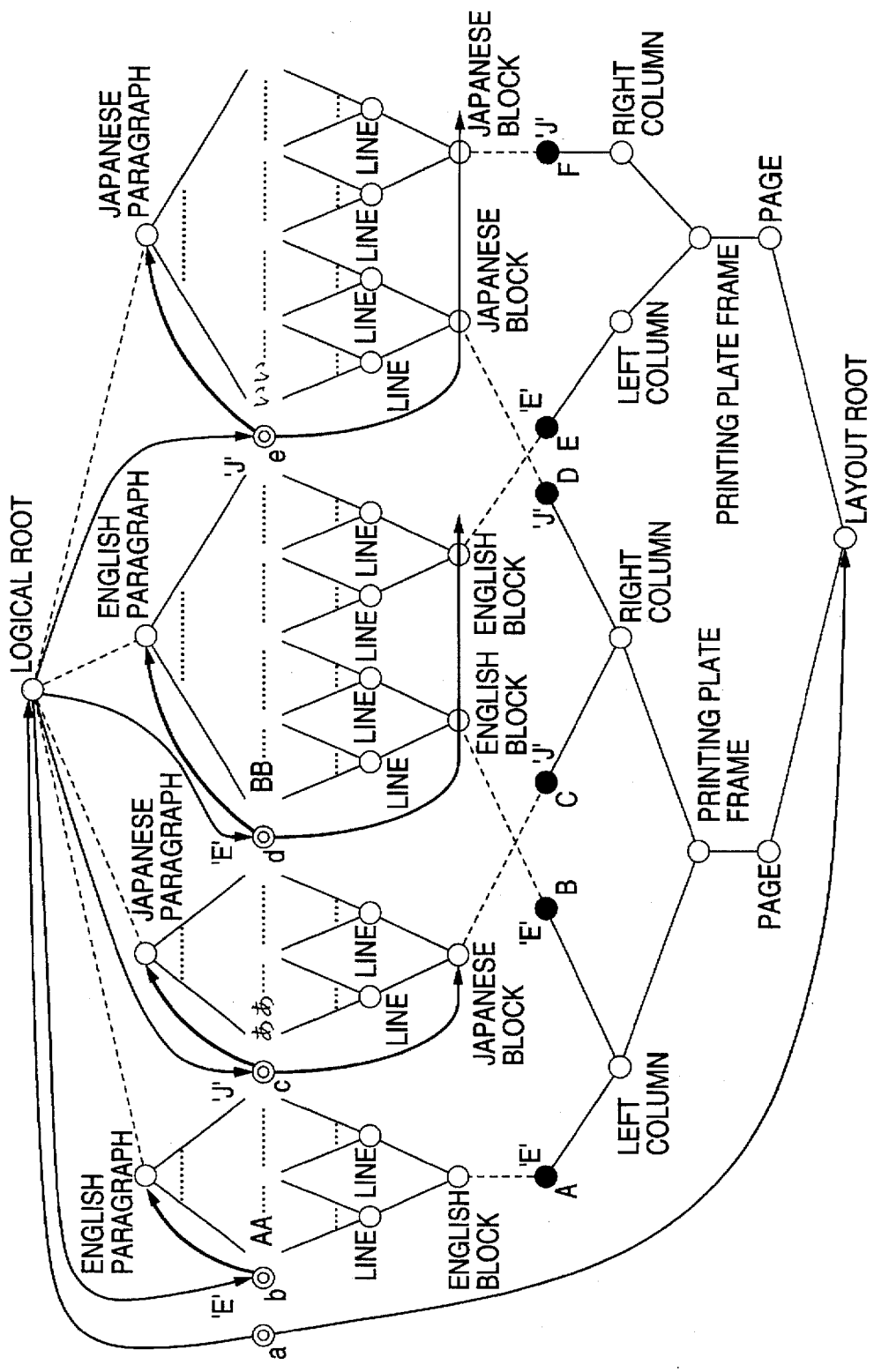
FIG. 32 shows a relationship between a logical structure and a layout structure of the document having a plurality of streams of FIGS. 7A and 7B into which embedding nodes and mold nodes have been introduced.
Figure 39:
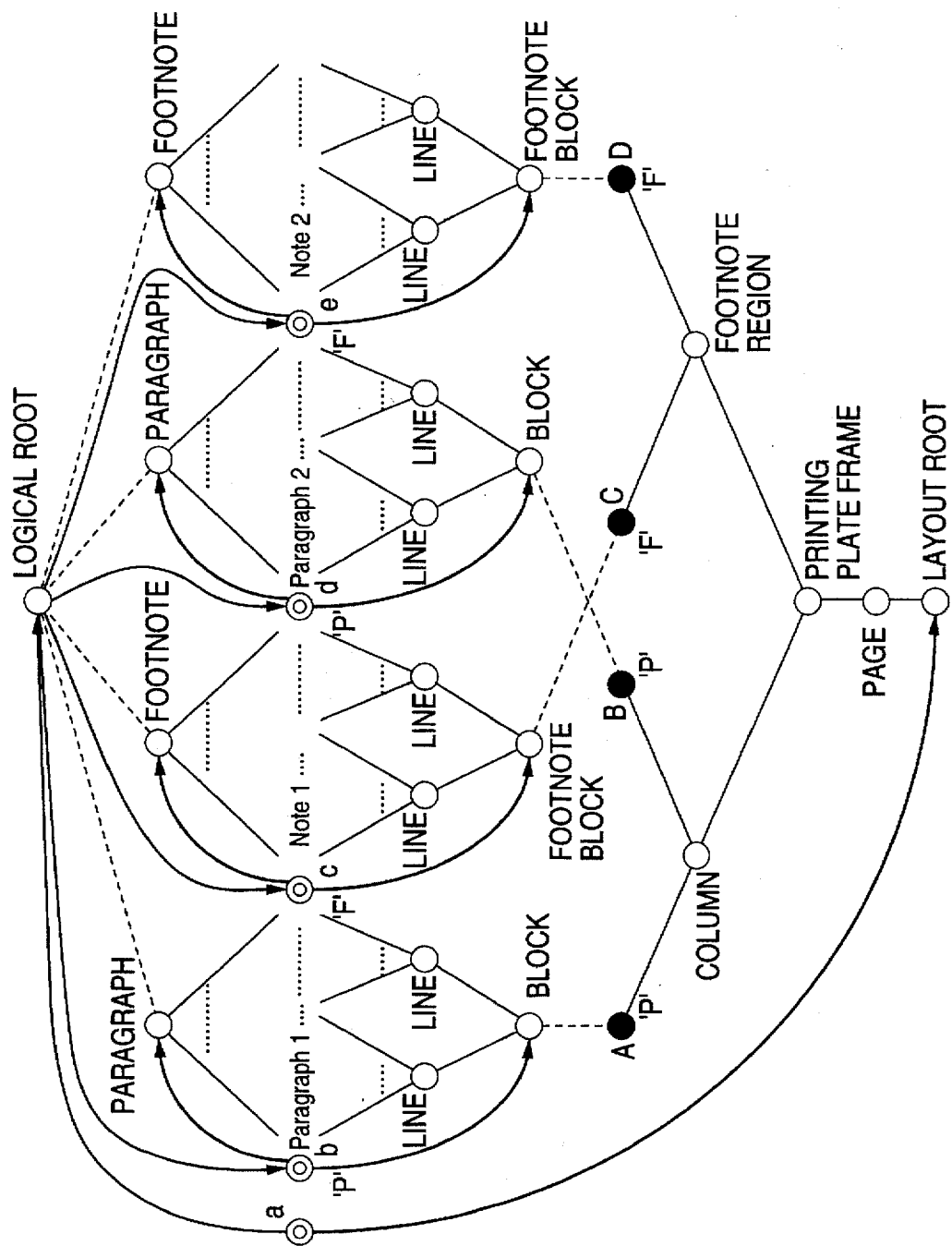
FIG. 39 shows a relationship between a logical structure and a layout structure of the document having footnotes of FIG. 12 into which embedding nodes and mold nodes have been introduced.

FIG. 24 shows a relationship between the logical structure and the layout structure of the document of FIGS. 2A and 2B in which embedding nodes and mold nodes are introduced. FIG. 32 shows a relationship between the logical structure and the layout structure of the document of FIGS. 7A and 7B in which embedding nodes and mold nodes are introduced. FIG. 39 shows a relationship between the logical structure and the layout structure of the document of FIG. 12 in which embedding nodes and mold nodes are introduced. In these figures, symbols ⊙ and • represent embedding nodes and mold nodes, respectively.

First, the embedding nodes will be described. The embedding nodes are nodes for expressing a corresponding relationship between unit logical nodes and unit layout nodes. A unit logical node (one node) and a unit layout node (one or a plurality of nodes) are located immediately below an embedding node and are subordinate thereto. By introducing an embedding node, a depending relationship between a logical node immediately above a unit logical node and the unit logical node is eliminated. Instead, the embedding node is made subordinate to the logical node immediately above it. In other words, the logical node immediately above the unit logical node and the unit logical node have a depending relationship via the embedding node.

For example, 10 embedding nodes a–j are introduced in FIG. 24. Node a represents a correspondence between the logical root node and the layout root node. Nodes b and g represent a correspondence between the header node and the header frame node. Each of nodes c and h represents a correspondence between the section number node and the block node. Each of nodes d and i represents a correspondence between the header text node and the block node. Each of nodes e, f and j represents a correspondence between the paragraph node and the block node.

In FIG. 32, five embedding nodes a–e are introduced. Node a represents a correspondence between the logical root node and the layout root node. Each of nodes b and d represents a correspondence between the English paragraph node and the English block node. Each of nodes c and e represents a correspondence between the Japanese paragraph node and the Japanese block node.

Further, in FIG. 39, five embedding nodes a–e are introduced. Node a represents a correspondence between the logical root node and the layout root node. Each of nodes b and c represents a correspondence between the paragraph node and the block node. Each of nodes d and e represents a correspondence between the footnote node and the footnote block node.

In FIG. 24, the header node, for instance, is a unit logical node. Embedding node b is inserted between the header node of the logical structure and the section node, which is immediately above the header node, and represents a corresponding relationship between the header node and the corresponding header frame node of the layout structure. The embedding nodes are inserted for the other unit logical nodes, and each of the inserted embedding nodes indicates a corresponding relationship with the corresponding node of the layout structure.

The embedding node has a stream attribute of a stream to which the unit logical node immediately below the embedding node belongs. The stream attribute is used to correlate the mold node with the unit layout node. For example, in the example of FIG. 32, the stream attributes can distinguish between Japanese and English. In the example of FIG. 39, the stream attributes can distinguish between the paragraphs and the footnotes. Since there is only one stream attribute in the example of FIG. 24, it may be omitted.

Next, the mold node will be described, which is disposed in place of the unit layout node. By introducing a mold node, a depending relationship between a layout node immediately above a unit layout node and the unit layout node is eliminated. Instead, the mold node is made subordinate to the layout node immediately above the mold node.

For example, in FIG. 24, 10 mold nodes A–J are introduced. Nodes A and G are mold nodes that are disposed in place of the header frame nodes. Nodes B and H are mold nodes that are disposed in place of the section number nodes. Nodes B and H are mold nodes that are disposed in place of the block nodes corresponding to the section number nodes. Nodes C and I are mold nodes that are disposed in place of the block nodes corresponding to the header text nodes. Nodes D, E, F and J are mold nodes that are disposed in place of the block nodes corresponding to the paragraph nodes.

In FIG. 32, five mold nodes A–F are introduced. Nodes C, D and F are mold nodes that are disposed in place of the Japanese block nodes. Nodes A, B and E are mold nodes that are disposed in place of the English block nodes.

In FIG. 39, four mold nodes A–D are introduced. Nodes A and B are mold nodes that are disposed in place of the block nodes. Nodes C and D are mold nodes that are disposed in place of the footnote block nodes.

In FIG. 24, for example, the header frame node immediately below the left column node is a unit layout node. A depending relationship between the header frame node and the left column node immediately above it is eliminated, and mold node A is disposed below the left column node in place of the header frame node. The same thing applies to the remaining unit layout nodes in FIG. 24 and the examples of FIGS. 32 and 39.

Each mold node has a stream attribute which indicates what stream the associated mold node belongs to. For example, the this stream attribute distinguishes between Japanese and English in FIG. 32, and between the paragraph and footnote in FIG. 39. Since there is only one stream in FIG. 24, the stream attribute can be omitted.

Which unit layout node a certain mold node belongs to is determined by the stream to which the mold node belongs to and its position in the stream. First, all the embedding nodes having the stream attribute as a certain mold node are picked up. Then, all the unit layout nodes existing immediately below these embedding nodes are arranged in the depth-preference order. Then, the mold nodes belonging to the same stream are arranged in the depth-preference order. In these arrangements, the ith mold node corresponds to the ith unit layout node.

For example, consider mold node F in FIG. 24. Mold nodes A, D, E, F, G and J belong to the same stream, and mold node F appears fourthly. Embedding nodes b, e, f, g and j belong to the stream corresponding to the above stream. As for the unit layout nodes immediately below these embedding nodes, the header frame node of the left column of page 1 exists immediately below embedding node b, the block node of the left column of page 1 and the first block node of the right column of page 1 exist immediately below embedding node e, the second block node of the right column of page 1 exists immediately below embedding node f, the header frame node of the left column of page 2 exists immediately below embedding node g, and the block node of the left column of page 2 exists immediately below embedding node j. All of these nodes are arranged in the order of the header frame node of the left column of page 1, the block node of the left column of page 1, the first block node of the right column of page 1, the second block node of the right column of page 1, the header frame node of the left column of page 2, and the block node of the left column of page 2. The fourth node in this arrangement, i.e., the second block node of the right column of page 1 corresponds to mold node F.

In the examples of FIGS. 32 and 39, a mold node and a corresponding unit layout node are known from an arrangement of mold nodes having a certain stream attribute and an arrangement of unit layout nodes immediately below the embedding nodes having the same stream attribute. For example, in FIG. 32, assume here that a stream attribute "E" is specified for the English paragraph nodes and the English block nodes and a stream attribute "J" is specified for the Japanese paragraph nodes and the Japanese block nodes. Mold node B has the stream attribute "E," and is the second one of mold nodes A, B and E that belong to the same stream. Embedding nodes b and d belong to the embedding node stream having the stream attribute "E." The unit layout node immediately below embedding node b is the first English block node of the left column of page 1, and the unit layout nodes immediately below embedding node d are the second English block node of the left column of page 1 and the English block node of the left column of page 2. Since the second English block node of the left column of page 1 is the second one in this arrangement of unit layout nodes, it is judged to correspond to mold node B. The same thing applies to the example of FIG. 39 having footnotes.

An explanation will be made of an example of a description method of a document into which the above-described embedding nodes and mold nodes have been introduced. This example uses tags as in the case of SGML. It is naturally possible to use other methods such as indenting and using id's as in ODA. According to the description method explained below, a document into which embedding nodes and mold modes have been introduced can easily be expressed by nesting of embedding descriptions.

When a certain embedding node is given, there are picked up the part of the logical nodes, layout nodes, end nodes, mold nodes and embedding nodes directly or indirectly subordinate to the given embedding node which part are subordinate to the given embedding node without intervention of the next-level embedding nodes. With respect to the nodes thus selected, the start tags and end tags of the logical nodes, the start tags and end tags of the layout nodes, the corresponding lower-level embedding descriptions, and the tags of the mold nodes are so arranged as to satisfy the conditions described below, and the start tag and end tag of the given embedding node are added at the head and tail of the description. Thus, the intended embedding description is obtained.

The conditions to be applied in arranging tags and end nodes are as follows:

(1) The start tags and end tags of the logical nodes, the end nodes (characters etc.), the start tags and end tags of the embedding nodes appear in such an order as they appear when the logical structure is scanned in the depth-preference order, except the items appearing in the lower-level embedding descriptions.

(2) The start tags and end tags of the layout nodes and the end nodes (characters etc.) appear in such an order as they appear when the layout structure is scanned in the depth-preference order, except the items appearing in the lower-level embedding descriptions.

(3) The lower-level embedding descriptions appear as they are as partial arrangements.

(4) A descriptor of a mold node appears after (if possible, immediately after) the corresponding embedding description.

First, an explanation will be made of an embedding description for embedding node a that corresponds to the logical root node. FIG. 25 is an example of an embedding description for the logical root node of the document shown in FIGS. 2A and 2B. <embedding> that appears first and <\embedding> that appears last are a start tag and an end tag of the embedding node, respectively. A start tag indicated by "<(log)" and ">" is a start tag of the logical node, and an end tag indicated by "<(log)" and ">" is its end tag. A start tag indicated by "<(lay)" and ">" is a start tag of the layout node, and an end tag indicated by "<(lay)" and ">" is its end tag. <mold> is a tag indicating the mold node. Explanations for the other tags are omitted here. This description has not been developed to the next-level embedding descriptions.

FIG. 26 shows an example of embedding descriptions for embedding nodes b and g corresponding to the respective header nodes of the document of FIGS. 2A and 2B. FIG. 27 shows an example of embedding descriptions for embedding nodes c and h corresponding to the respective section number nodes of the same document. FIG. 28 shows an example of embedding descriptions for embedding nodes d and i corresponding to the respective header text nodes of the same document. FIG. 29 shows an example of embedding descriptions for embedding nodes e, f and g corresponding to the respective section nodes of the same document. Each of the above embedding descriptions uses the first appearing start tag <embedding> and the last appearing end tag <\embedding> as in the case of the example of FIG. 25.

FIGS. 30 and 31 show an example of an embedding description for the entire document of FIGS. 2A and 2B. The portions of FIGS. 30 and 31 are continuous in the order of figure numbers. The description of FIGS. 30 and 31 is one obtained by developing the lower-level embedding descriptions in the embedding description for the logical root node shown in FIG. 25 by using the embedding descriptions of FIGS. 26–29, and then collecting the resulting descriptions into a single description.

In each embedding description, when attention is directed to only the start tags and end tags of the logical nodes and the descriptors of the end nodes (characters etc.), a part of the logical structure is expressed in a processable form. Similarly, when attention is directed to the start tags and end tags of the layout nodes and the descriptors of the end nodes (characters), a part of the layout structure is expressed in a processable form except those appearing in the lower-level embedding description.

In the document under consideration, the tag representing a mold node appears immediately after the tag indicating the end of the corresponding embedding node. However, since embedding node e has the two unit layout nodes, another mold node appears thereafter.

Figure 7A:
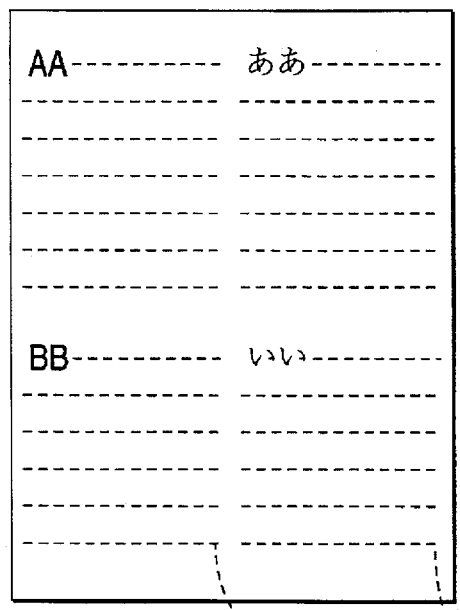
FIGS. 7A and 7B show an example of a multiple stream document.
Figure 7B:
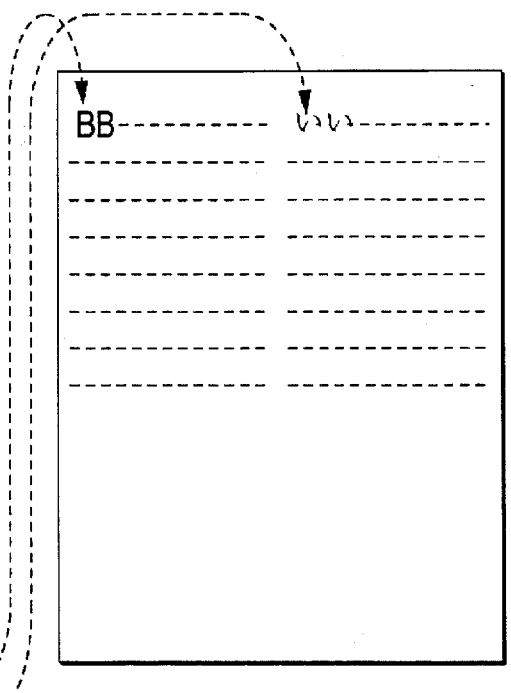
Figure 8:
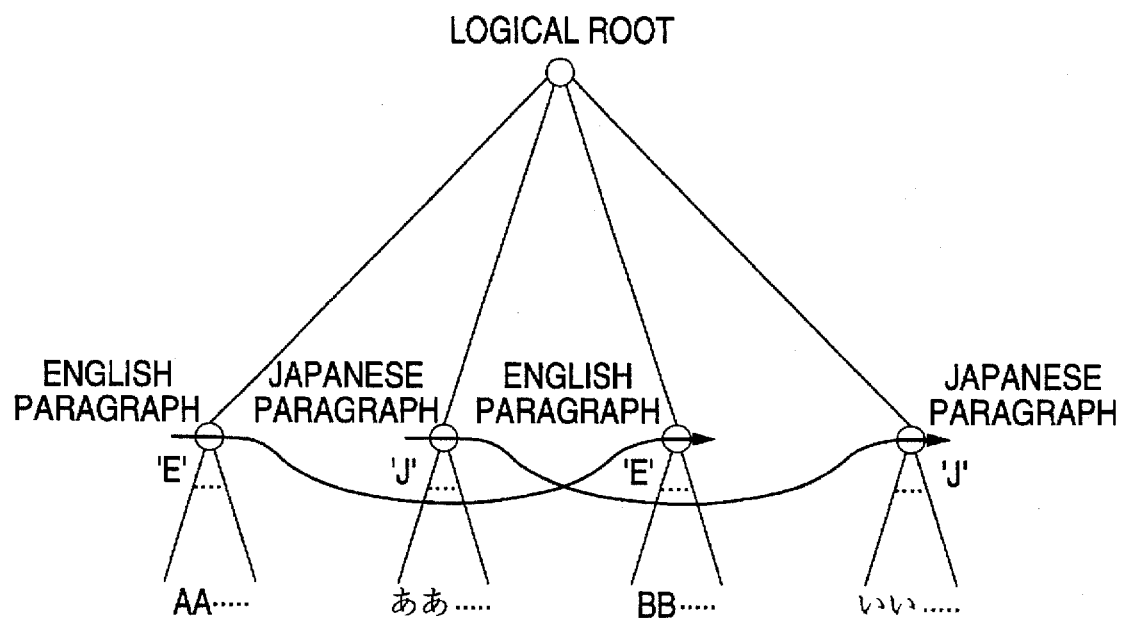
FIG. 8 shows a logical structure of the document of FIGS. 7A and 7B.
Figure 9:
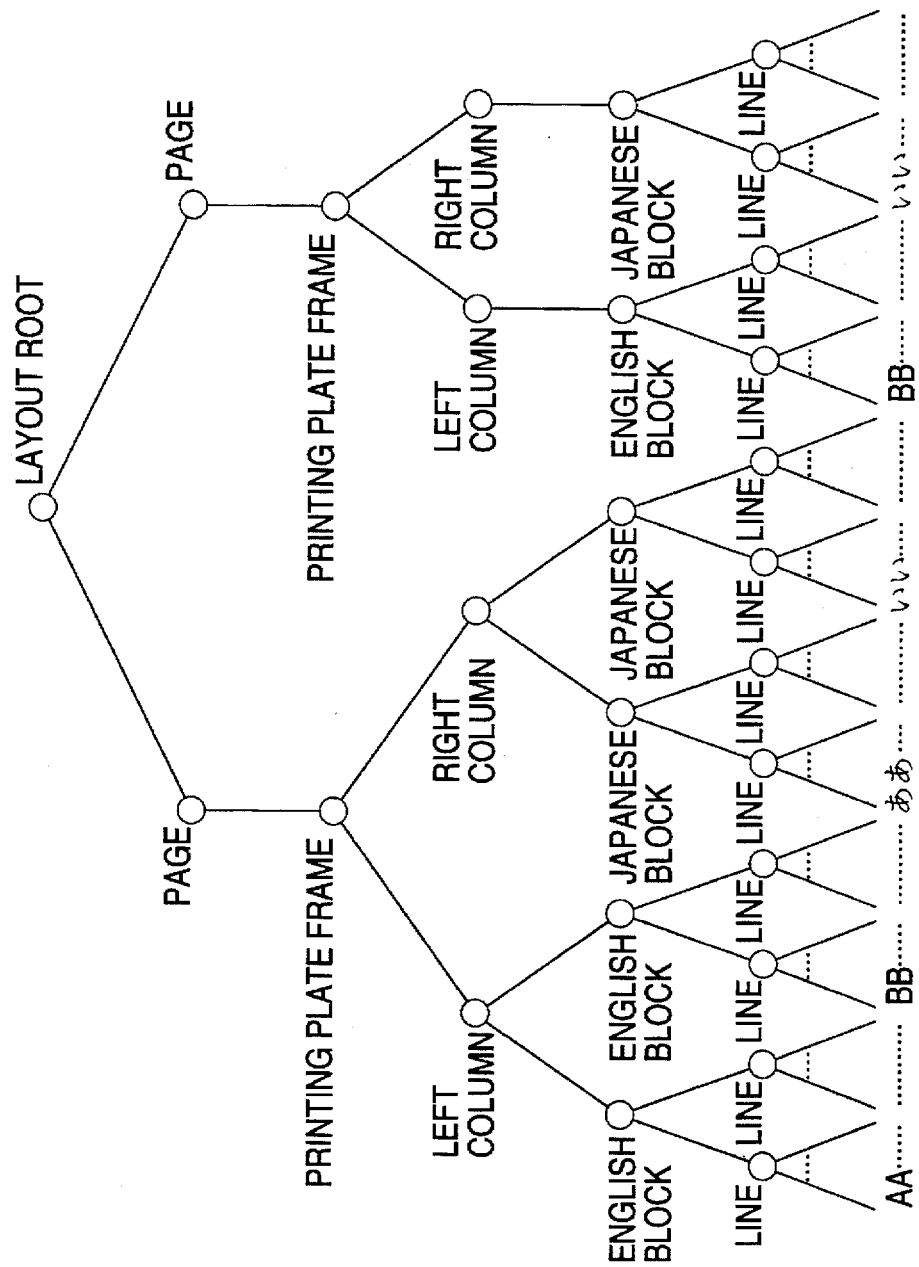
FIG. 9 shows a layout structure of the document of FIGS. 7A and 7B.
Figure 10:
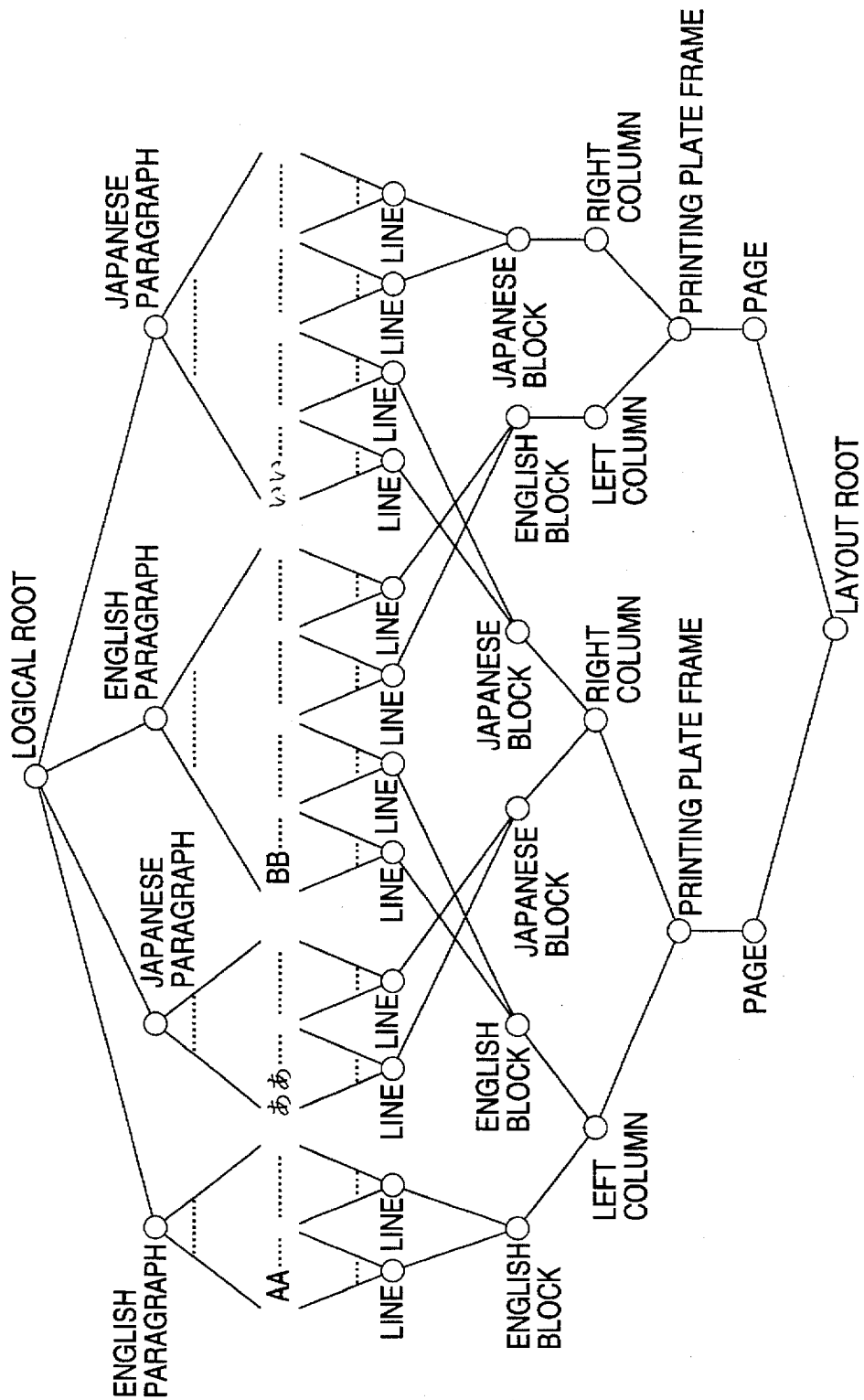
FIG. 10 shows a relationship between the logical structure and the layout structure of the document of FIGS. 7A and 7B.
Figure 11:
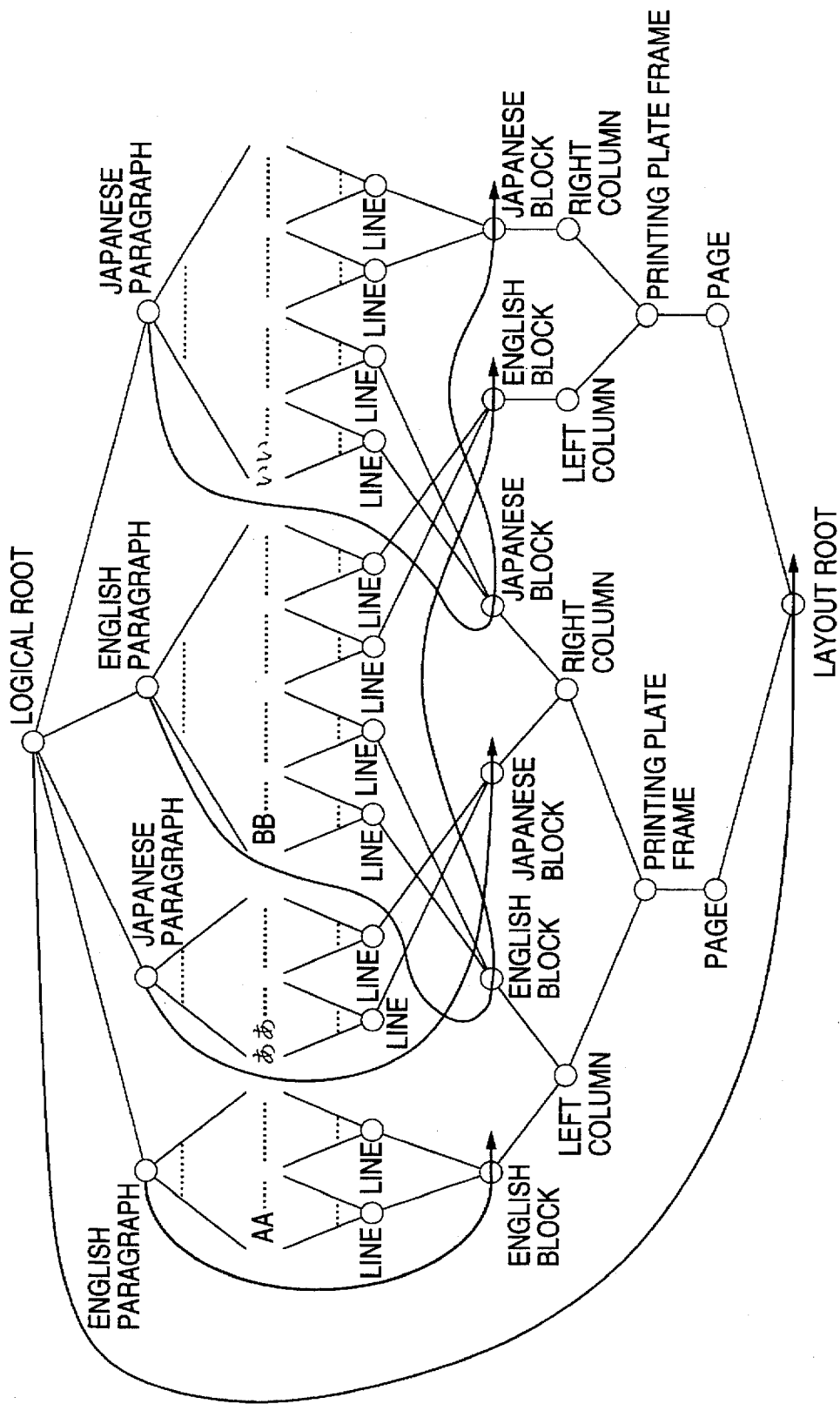
FIG. 11 shows a relationship between unit logical nodes and unit layout nodes of the document of FIGS. 7A and 7B.

FIG. 33 shows an example of an embedding description for the logical root node of the document having a plurality of streams of FIGS. 7A and 7B. <mold stream=E> represents a mold node having a stream attribute "E," and <mold node=J> represents a mold node having a stream attribute "J." The other items of the description are written in the same manner as in the case of FIG. 25.

FIG. 34 shows an example of an embedding description for embedding node b corresponding to the first English paragraph node of the document of FIGS. 7A and 7B. FIG. 35 shows an example of an embedding description for embedding node c corresponding to the first Japanese paragraph node of the same document. FIG. 36 shows an example of an embedding description for embedding node d corresponding to the second English paragraph node of the same document. FIG. 37 shows an example of an embedding description for embedding node e corresponding to the second Japanese paragraph node of the same document. A stream attribute is described in the start tag of each embedding description. For example, the start tag of the embedding description for embedding node b corresponding to the first English paragraph node includes <embedding stream=E>, which means this embedding node has the stream attribute The same thing applies to the other embedding descriptions. <embedding stream=J> means that the embedding node has the stream attribute "J."

FIG. 38 shows an example of an embedding description for the entire document having a plurality of streams of FIGS. 7A and 7B. The description of FIG. 38 is one obtained by developing the lower-level embedding descriptions in the embedding description corresponding to the logical root node shown in FIG. 33 by using the embedding descriptions of FIGS. 34–37, and collecting the resulting descriptions into a single description.

As in the case of the embedding descriptions of FIGS. 25–31, in each embedding description, when attention is directed to only the start tags and end tags of the logical nodes and the descriptors of the end nodes (characters etc.), a part of the logical structure is expressed in a processable form. Similarly, when attention is directed to the start tags and end tags of the layout nodes and the descriptors of the end nodes (characters), a part of the layout structure is expressed in a processable form except those appearing in the lower-level embedding description.

However, since the document under consideration has a plurality of streams, a mold node does not necessarily appear immediately after the corresponding embedding description. For example, immediately after [Embedding description for the first Japanese paragraph node], [Embedding description for the second English paragraph node] rather than the corresponding mold node. The corresponding mold node appears far after. When an embedding node has two unit layout nodes, the second mold node appears later. However, the tag of a mold node necessarily appears after the corresponding embedding description.

Figure 12:
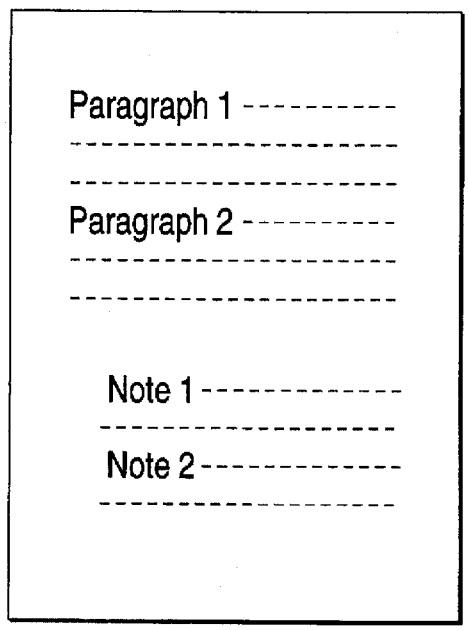
FIG. 12 shows an example of a document having footnotes.
Figure 13:
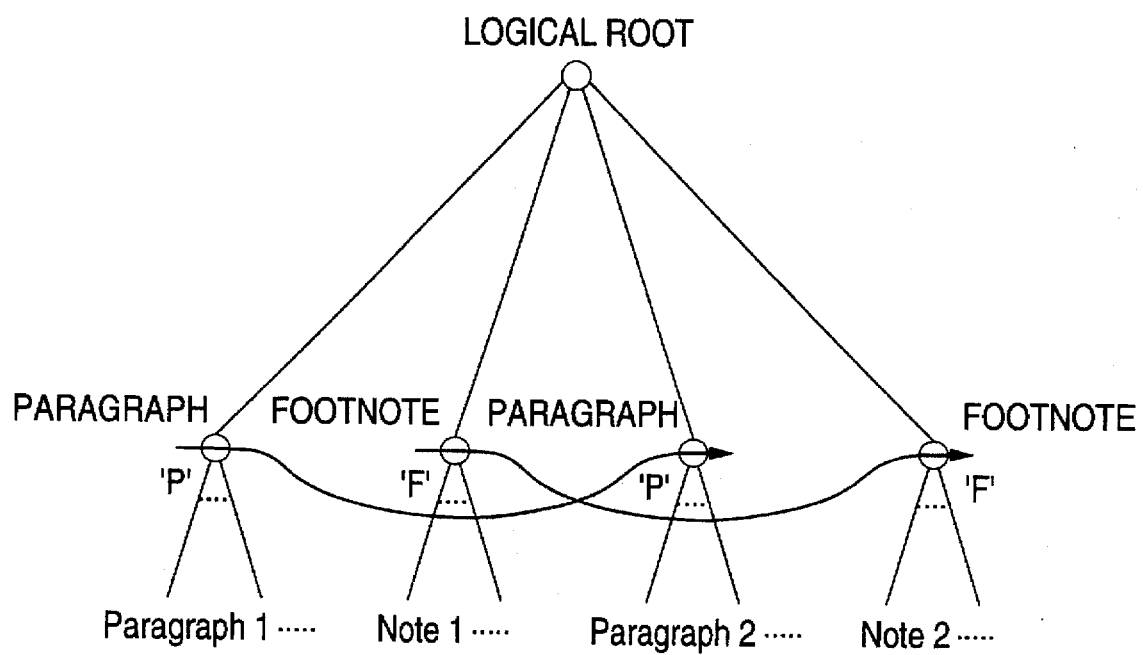
FIG. 13 shows a logical structure of the document having footnotes of FIG. 12.
Figure 14:
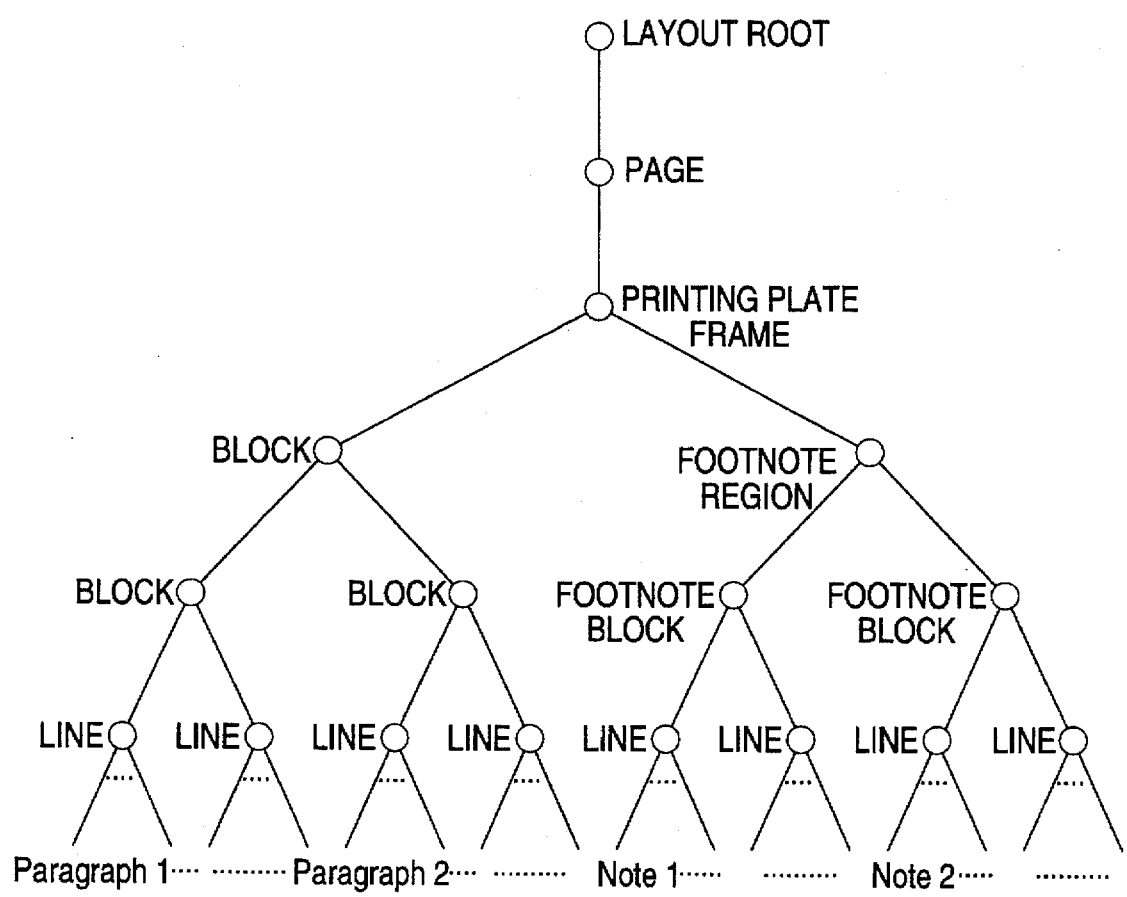
FIG. 14 shows a layout structure of the document having footnotes of FIG. 12.
Figure 15:
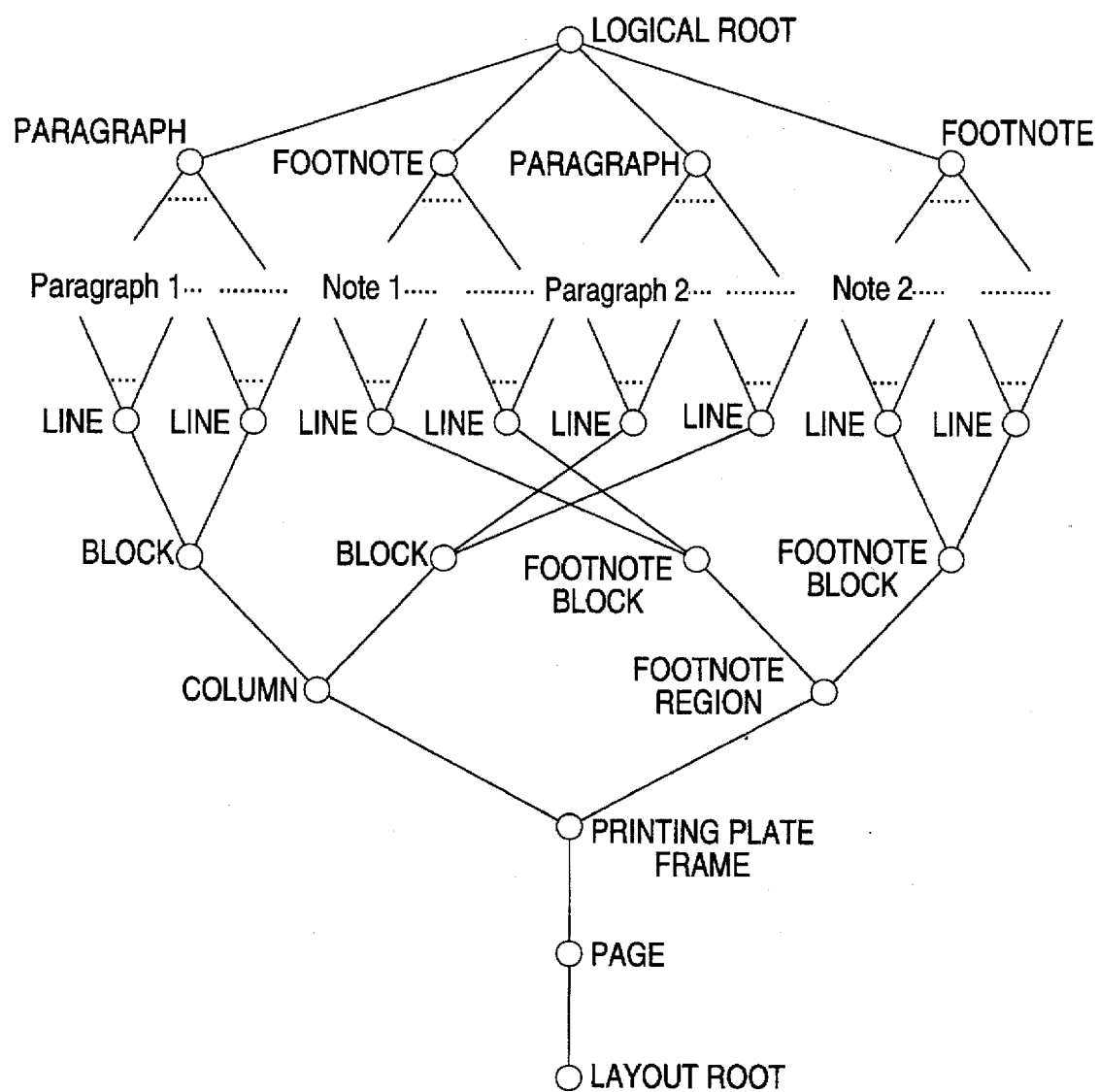
FIG. 15 shows a relationship between the logical structure and the layout structure of the document having footnotes of FIG. 12.
Figure 16:
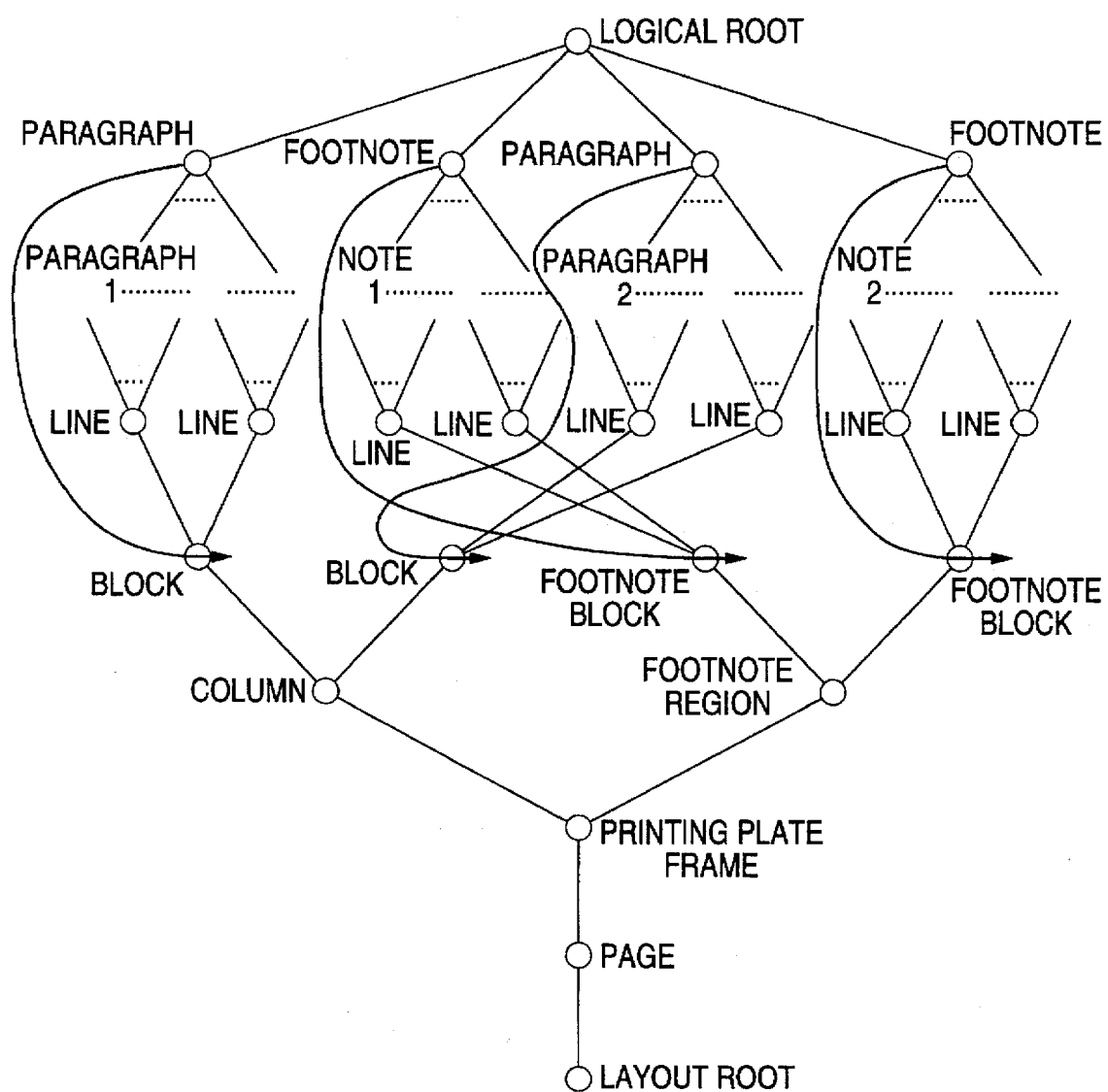
FIG. 16 shows a relationship between unit logical nodes and unit layout nodes of the document having footnotes of FIG. 12.

FIG. 40 shows an example of an embedding description for the logical root node of the document of FIG. 12. <mold stream=P> represents a mold node having a stream attribute "P," and <mold stream=F> represents a mold node having a stream attribute "F." The other tags are written in the same manner as in the above examples.

FIG. 41 shows an example of an embedding description for embedding node b corresponding to the first paragraph node of the document having footnotes of the document of FIG. 12. FIG. 42 shows an example of an embedding description for embedding node c corresponding to the first footnote node of the document having footnotes of the same document. FIG. 43 shows an example of an embedding description for embedding node d corresponding to the second paragraph node of the document having footnotes of the same document. FIG. 44 shows an example of an embedding description for embedding node e corresponding to the second footnote node of the document having footnotes of the same document. A stream attribute is described in the start tag of each embedding description. For example, the start tag of the embedding description for embedding node b corresponding to the first paragraph node includes <embedding stream=P>, which means this embedding node has the stream attribute "P." The same thing applies to the other embedding descriptions. <embedding stream=F> means that the embedding node has the stream attribute "F," i.e., is a footnote node.

FIG. 45 shows an example of an embedding description for the entire document having footnotes of FIG. 12. The description shown in FIG. 45 is one obtained by developing the lower-level embedding descriptions in the embedding description corresponding to the logical root node shown in FIG. 40 by using the embedding descriptions of FIGS. 41–44, and collecting the resulting descriptions into a single description.

As in the case of the above two documents, in each embedding description, when attention is directed to only the start tags and end tags of the logical nodes and the descriptors of the end nodes (characters etc.), a part of the logical structure is expressed in a processable form. Similarly, when attention is directed to the start tags and end tags of the layout nodes and the descriptors of the end nodes (characters), a part of the layout structure is expressed in a processable form except those appearing in the lower-level embedding description.

Next, various kinds of processing performed in the document processing section 2 shown in FIG. 1 will be described. First, a description will be made of logical structure extracting processing performed in the logical structure extracting section 3. It is assumed that an extracted logical structure is written to an output file, that the document retaining section 1 is, for instance, an input file stored in a memory device, and that the format of a document stored in the input file is expressed, for instance, by using start tags and end tags as described above.

Figure 46:
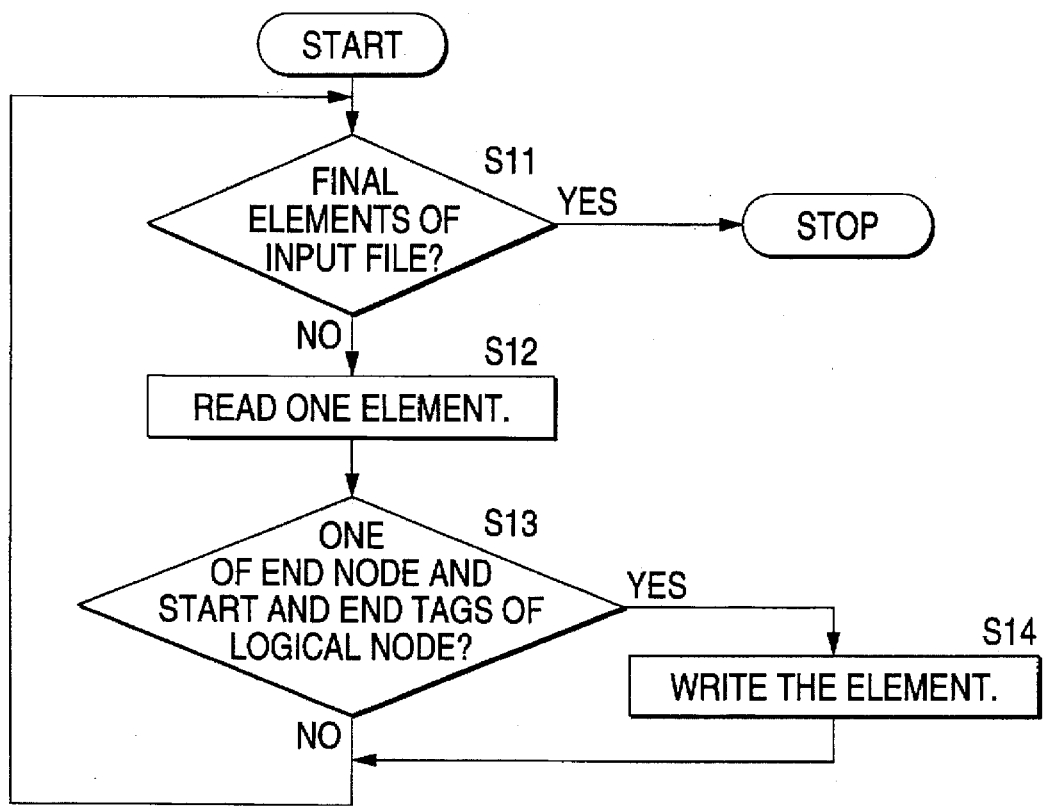
FIG. 46 is a flowchart showing an example of a logical structure extracting process.

FIG. 46 is a flowchart showing an example of the operation of the logical structure extracting section 3. First, in step S11, it is judged whether the element concerned is the final one of the input file. If the judgment is affirmative, the process is finished. If the judgment is negative, the process goes to step S12, where one element (a tag or end node) is read from the input file. In step S13, it is judged whether the element thus read is one of an end node and start and end tags of a logical node. If the judgment is affirmative, the element concerned is written to the output file in step S14, and the process returns to step S11. If the judgment is negative, the process directly returns to step S11.

In the above manner, only the end nodes and the start and end tags of the logical nodes in the input file are written to the output file. A list of the elements as written to the output file represents a document structure of processable form. Therefore, various kinds of document processing on a document of processable form, such as reuse of the document, can be performed using this output file. Further, the output file can be used as an input of another document editor which can handle documents of processable form.

Figure 47:
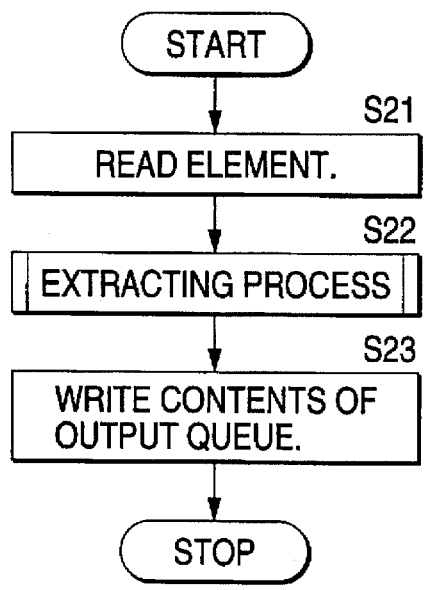
FIGS. 47 and 48 are flowcharts showing an example of a layout structure extracting process.
Figure 48:
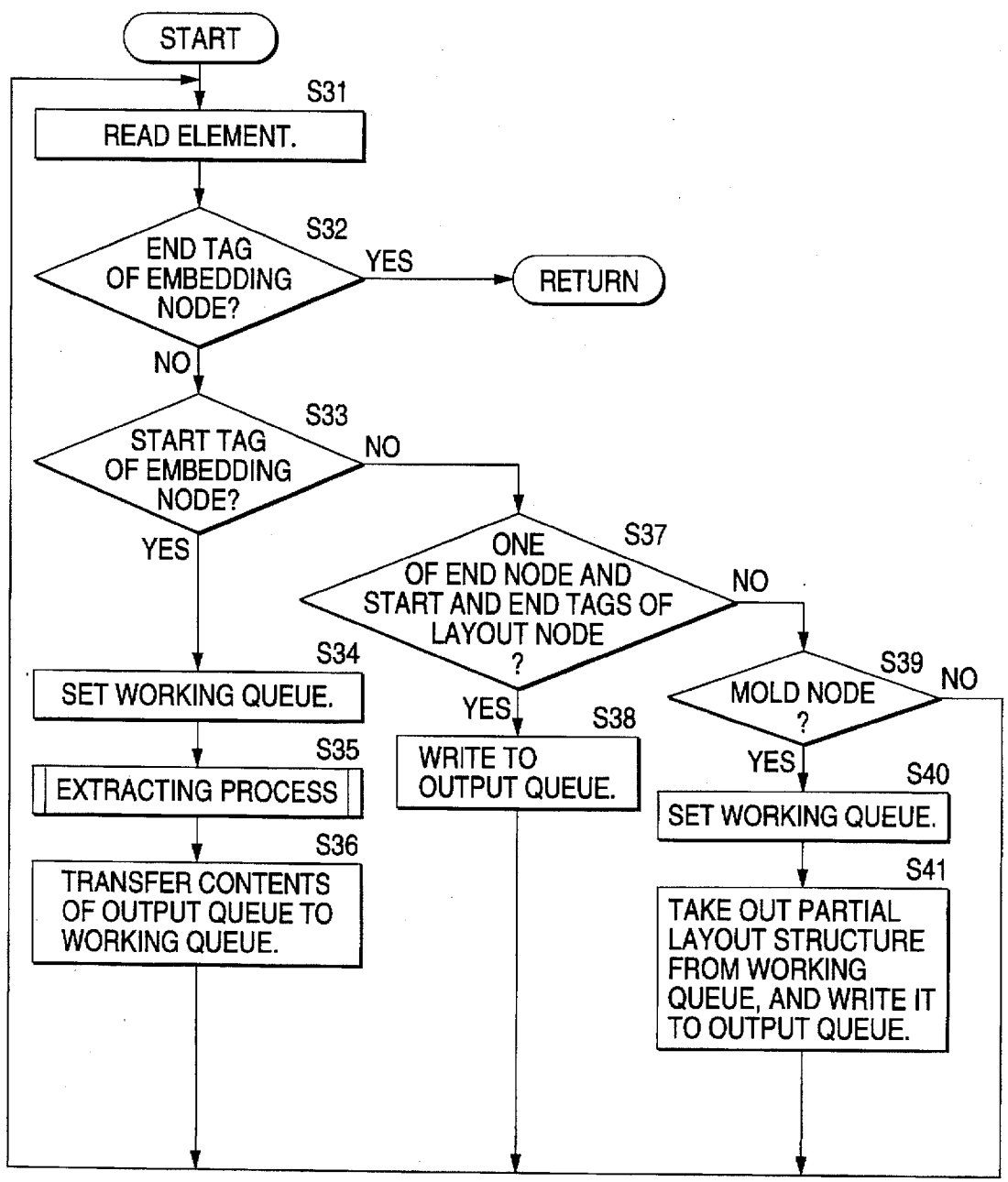

A description will be made of layout structure extracting processing that is performed in the layout structure extracting section 4. FIGS. 47 and 48 are flowcharts showing an example of the operation of the layout structure extracting section 4. Also it is assumed in the following description of the layout structure extracting operation that an extracted layout structure is written to an output file, that the document retaining section 1 is, for instance, an input file stored in a memory device, and that the format of a document stored in the input file is expressed, for instance, by using start tags and end tags as described above.

First, in step S21, the head element is read from the input file. Then, in step S22, an extracting process shown in FIG. 48 is called. Descriptors of an extracted layout structure is stored in an output queue. In step S23, the descriptors of the layout structure stored in the output queue are written to the output file.

The extracting process of step S22 is called in a recursive manner every time a lower embedding description appears. Every time the extracting process of FIG. 48 is executed, working queues and a result output queue are secured. The working queues are secured by the number of streams of embedding nodes, while only one result output queue is secured.

In step S31 of FIG. 48, the head element is read from the input file. In step S32, it is judged whether the readout element is an end tag of an embedding node. If the judgment is affirmative, the process returns to the calling position. If the judgment is negative, it is judged in step S33 whether the readout element is a start tag of an embedding node. If the judgment is affirmative, the corresponding working queue is determined in step S34 based on a stream attribute of the start tag, and the extracting process itself is called recursively in step S35. In step S36, when the process returns from the extracting process, all the tags and end nodes stored in the output queue are taken out and stored in the working queue determined in step S34. Then, the process returns to step S31.

When it is judged in step S33 that the readout element is not a start tag of an embedding node, the process goes to step S37, where it is judged whether the element read in step S31 is one of an end node and a start tag and an end tag of a layout node. If the judgment is affirmative, the element is written to the output queue in step S38, and the process returns to step S31. If the judgment is negative, it is judged in step S39 whether the element is an descriptor of a mold node. If the judgment is negative, the process returns to step S31. If the judgment is affirmative, the corresponding working queue is determined in step S40 based on a stream attribute of the mold node. Then, in step S41, elements of one partial layout structure, i.e., a portion of the layout structure having one unit layout node as a top node are taken out and written to the output queue. Then, the process returns to step S31.

With the above processes, even where, for instance, end nodes appear in different orders in a logical structure and in a layout structure, they are arranged in the order in the layout structure in accordance with a plurality of streams and supplied to the output file, because they are written to an output queue every time a mold node appears from a working queue for each stream attribute. The output file is a document of formatted form having a layout structure, which, for instance, can be displayed on a screen or recorded in a recording medium by proper output processing. In this case, the output file can be recorded by a recording device after being converted to a document in a page description language, for instance. Further, the output file can be used as an input to another document editor which handles documents of formatted form.

Figure 49:
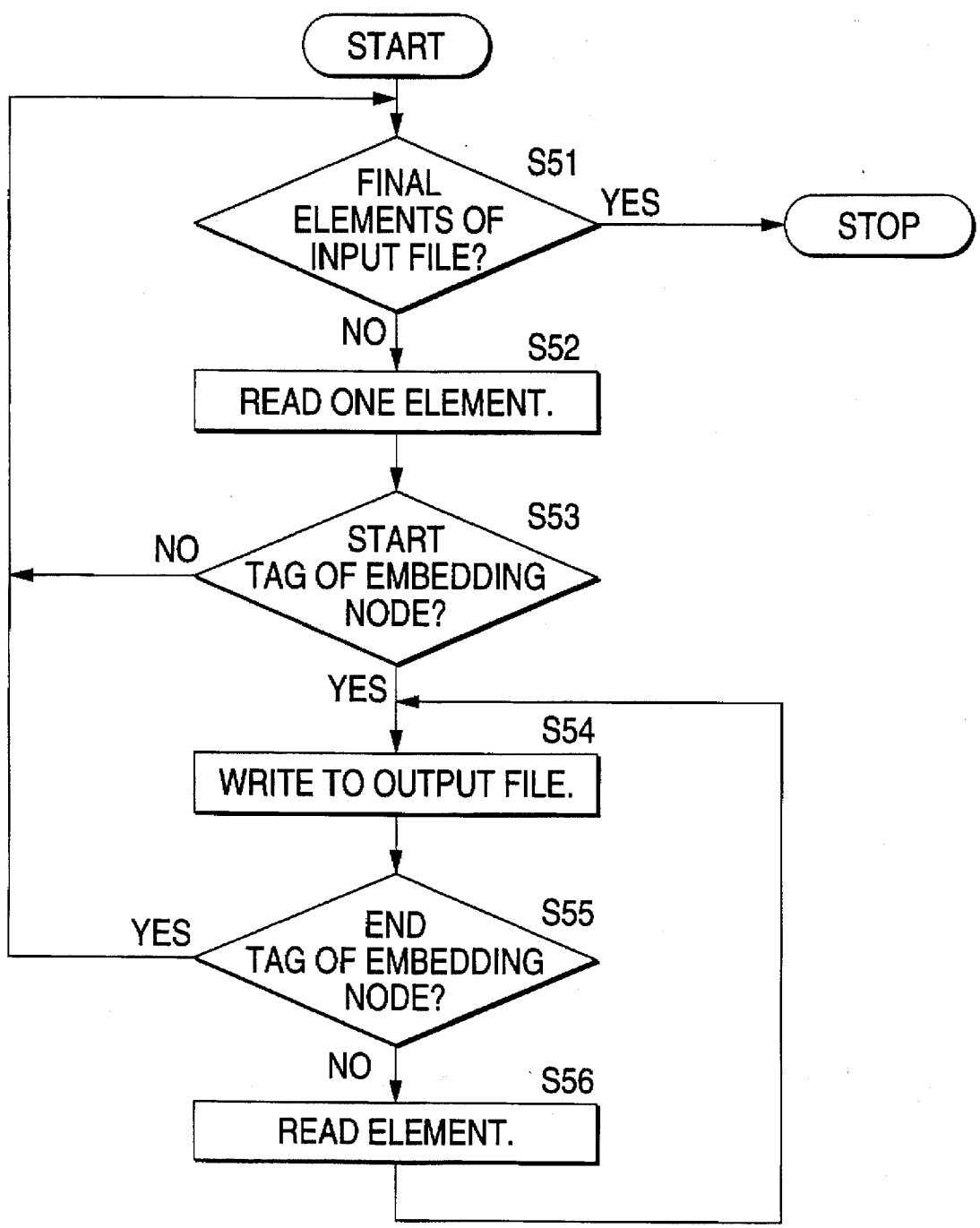
FIG. 49 is a flowchart showing an example of an embedding description extracting process.

A description will be made of an embedding description extracting process that is executed in the embedding extracting section 5. FIG. 49 is a flowchart showing an example of the operation of the embedding extracting section 5. Also it is assumed in the following description of the embedding descriptions extracting operation that extracted embedding description is written to an output file, that the document retaining section 1 is, for instance, an input file stored in a memory device, and that the format of a document stored in the input file is expressed, for instance, by using start tags and end tags as described above.

First, in step S51, it is judged whether the process has reached the end of an input file. If the judgment is affirmative, the process is finished. If the judgment is negative, one element is read from the input file in step S52. In step S53, it is judged whether the readout element is a start tag of an embedding description that satisfies a given condition. If the judgment is negative, the process returns to step S51.

If the judgment is affirmative, a portion of the embedding description is written to an output file in steps S54 and S55. More specifically, the current element is written to the output file in step S54. In step S55, it is judged whether the element is the corresponding end tag of the embedding description. If the judgment is negative, one element is read from the input file in step S56. Then, the process returns to step S54, where the readout element is written to the output file. When the corresponding end tag of the embedding description is found in step S55, the writing to the embedding description concerned to the output file is finished and the process returns to step S51, where an embedding description that satisfies the next given condition is retrieved.

An embedding description that has been extracted in the above manner has partial structures below a unit logical node and a unit layout node that satisfy a given condition. For example, a partial logical structure having a header node as a top node and a partial layout structure having a header frame node as a top node can be extracted easily. Using the extracted embedding descriptions, various kinds of processing such as editing with reuse of a document (for example, extracting a part of a document and using it for another document) can be performed. In this case, since an extracted partial structure has both of a logical structure and a layout structure, time and labor for generating a new layout are saved.

As is apparent from the above description, according to the invention, a logical structure and a layout structure can be expressed at the same time, a corresponding relationship between unit logical nodes and unit layout nodes can be indicated explicitly, and a document having a plurality of streams can be expressed. Therefore, the apparatus of the invention can process a variety of documents. Further, since there occur no redundant expressions of end nodes between the logical structure side and the layout structure side, it is possible to reduce the memory capacity.

In processing a document, a logical structure and a layout structure can easily be scanned in the depth-preference order. In doing so, since the entire document need not be stored in a memory, no memory management is necessary. Further, by extracting an embedding description, a partial logical structure and a partial layout structure that strongly correspond to each other can be extracted easily.

What is claimed is:

1. A document processing apparatus for processing a structured document, comprising:

document retaining means for retaining a structured document in which embedding nodes and mold nodes correlate a logical structure and a layout structure of the document with each other, the embedding nodes being inserted between each unit logical node and a logical node immediately above the unit logical node and representing a correspondence between the unit logical node and a unit layout node, and the mold nodes provided in place of respective unit layout nodes; and document processing means capable of processing a partial logical structure of the document retained by the document retaining means together with a partial layout structure corresponding to the partial logical structure.

2. The document processing apparatus of claim 1, wherein the document processing means comprises logical structure extracting means for extracting the logical structure from the document retained by the document retaining means.

3. The document processing apparatus of claim 1, wherein the document processing means comprises layout structure extracting means for extracting the layout structure from the document retained by the document retaining means.

4. The document processing apparatus of claim 1, wherein the document processing means comprises embedding extracting means for extracting, from the document retained by the document retaining means, a partial logical structure and a partial layout structure that are subordinate to an embedding node that satisfies a specified condition.

\* \* \* \* \*